United States Patent [19]

Resch

[11] 4,327,609
[45] May 4, 1982

[54] APPARATUS FOR REMOVING THE INSULATION FROM ELECTRICAL WIRES

[75] Inventor: Alois R. Resch, Heilbronn, Fed. Rep. of Germany

[73] Assignee: Bunker Ramo Corporation, Oak Brook, Ill.

[21] Appl. No.: 95,874

[22] Filed: Nov. 19, 1979

[51] Int. Cl.³ .............................................. H02G 1/12
[52] U.S. Cl. ..................................................... 81/9.51
[58] Field of Search ................... 81/9.51, 9.5 A, 9.5 R

[56] References Cited

U.S. PATENT DOCUMENTS

| | | | |
|---|---|---|---|
| 1,666,277 | 4/1928 | White | 81/9.51 |
| 2,285,167 | 6/1942 | Montgomery | 81/9.51 |
| 2,446,558 | 8/1948 | Schwartz et al. | 81/9.51 |
| 2,563,911 | 8/1951 | Beck | 81/9.51 |
| 2,671,363 | 3/1954 | Wells . | |
| 2,880,635 | 4/1959 | Harris . | |
| 3,084,574 | 4/1963 | Folkenroth | 81/9.51 |
| 3,176,550 | 4/1965 | Marcotte | 81/9.51 |
| 3,479,718 | 11/1969 | Van de Kerkhof | 81/9.51 |
| 3,588,984 | 6/1971 | Van de Kerkhof | 81/9.51 |
| 3,630,105 | 12/1971 | Rider | 81/9.51 |
| 3,748,932 | 7/1973 | Neiman et al. . | |
| 3,815,449 | 6/1974 | Folkenroth et al. | 81/9.51 |
| 3,913,426 | 10/1975 | Blaha | 81/9.51 |
| 3,935,759 | 2/1976 | Roth | 81/9.51 |
| 4,083,269 | 4/1978 | Resch | 81/9.51 |
| 4,084,310 | 4/1978 | Dragisic | 81/9.51 |

FOREIGN PATENT DOCUMENTS

| | | |
|---|---|---|
| 712958 | 11/1941 | Fed. Rep. of Germany . |
| 1124572 | 3/1962 | Fed. Rep. of Germany . |
| 2434250 | 1/1976 | Fed. Rep. of Germany . |
| 1347344 | 11/1963 | France . |
| 521433 | 4/1940 | United Kingdom . |
| 1105700 | 3/1968 | United Kingdom . |
| 1209761 | 10/1970 | United Kingdom . |
| 1229748 | 4/1971 | United Kingdom . |
| 1388741 | 3/1975 | United Kingdom . |

*Primary Examiner*—Roscoe V. Parker
*Attorney, Agent, or Firm*—F. M. Arbuckle; B. W. Sufrin

[57] ABSTRACT

An apparatus for removing the insulation from the end of an insulated electrical wire. A common disadvantage of this type of apparatus is that by clamping the insulation of the conductor on two sides, indentations and possibly even damage to the insulation may be caused. Further, owing to cutting into the insulation only from two sides, the piece of insulation to be removed cannot be cleanly cut prior to removal from the central conductor core. The present apparatus overcomes the above-described disadvantages and shortcomings and permits various types of insulation to be rapidly, cleanly, and simply, freed from the conductor core. The removal of the insulation is initiated by inserting the end of the wire into the apparatus, without fear of folding the end of the wire even in the case of very small diameters of the conductive core of the wire, whereupon the insulation is removed fully automatically. According to the apparatus, the above-noted problems are solved by providing an improved wire stripping apparatus comprising a housing having a hole for insertion of the wire to be stripped, a chuck having at least three jaws, a knife head employing at least three knives adapted for improved circumferential cutting, switch means which can be actuated by the insertion of the most delicate wires to be stripped, and motor-driven control which provide for the timed operation of components to provide a complete operating cycle.

33 Claims, 29 Drawing Figures

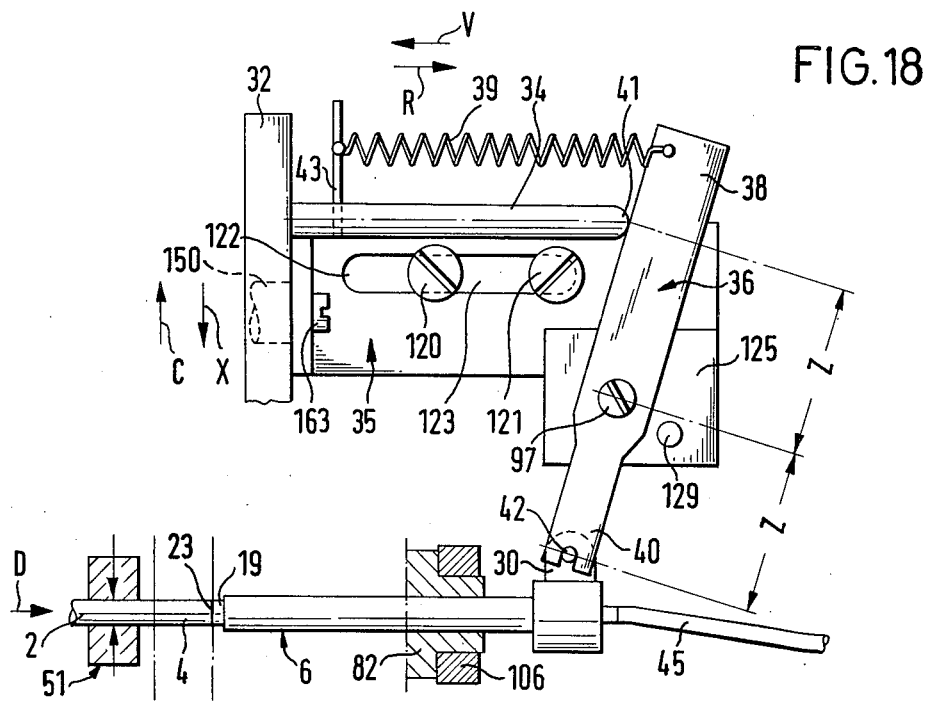
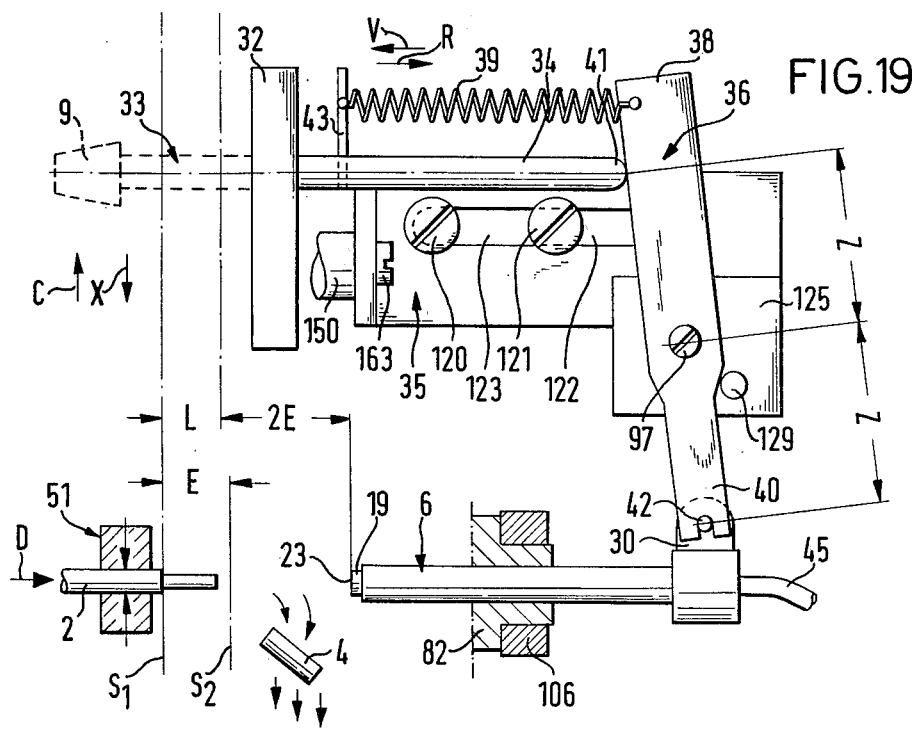

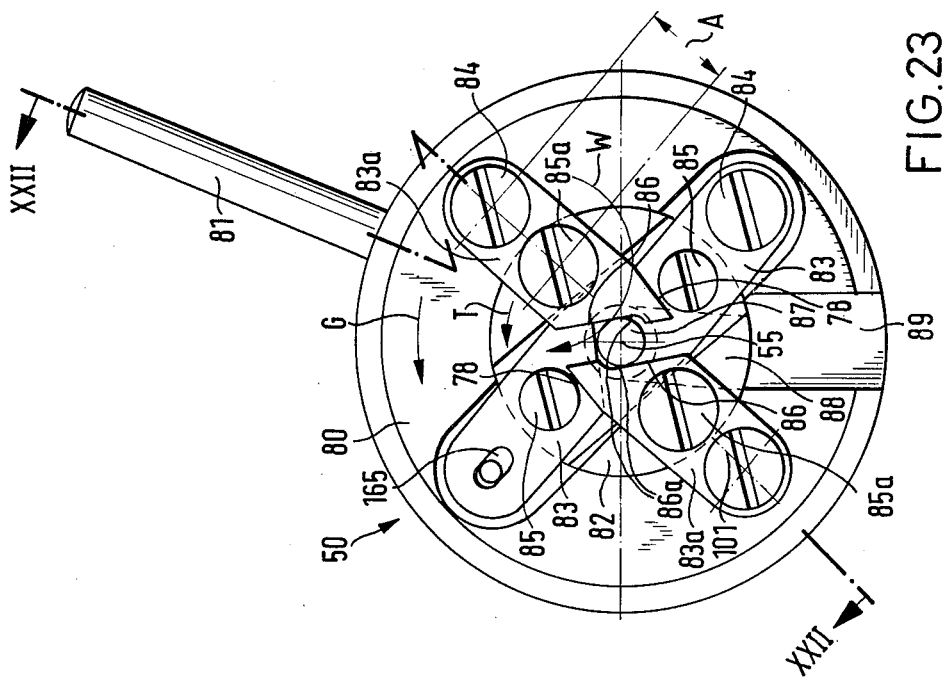
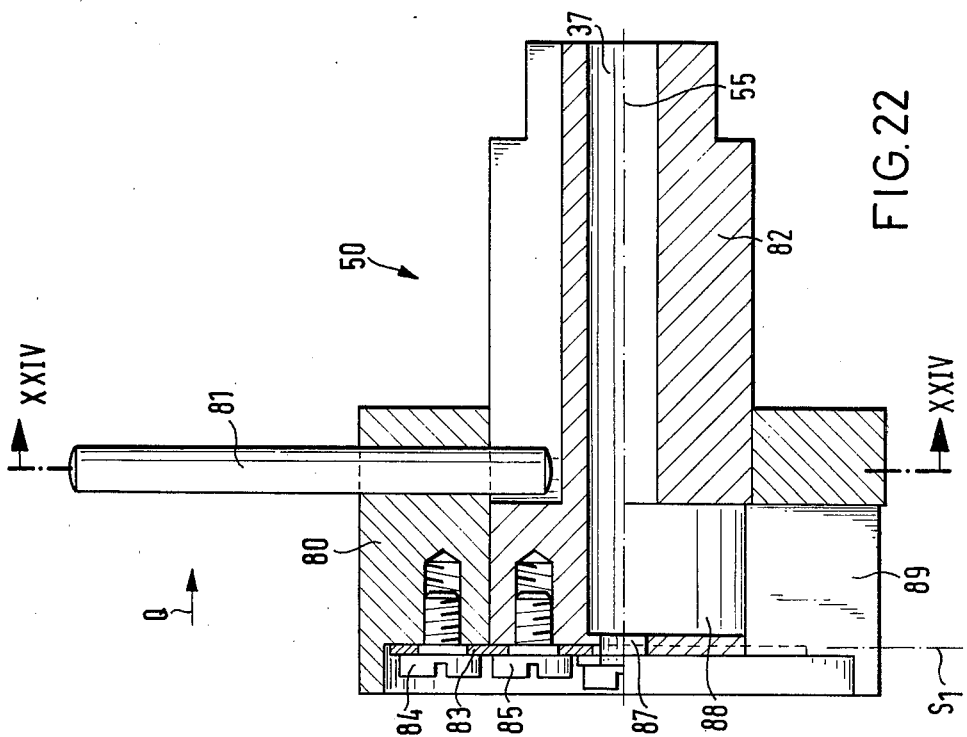

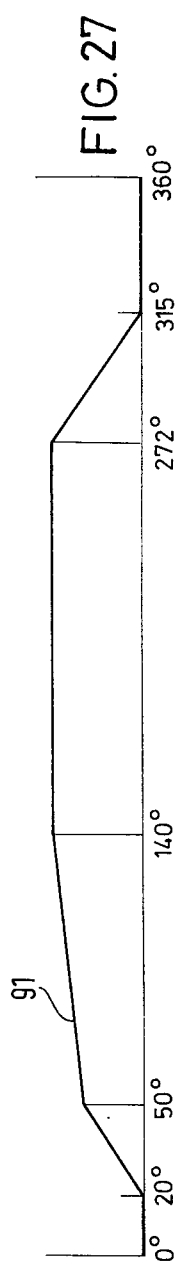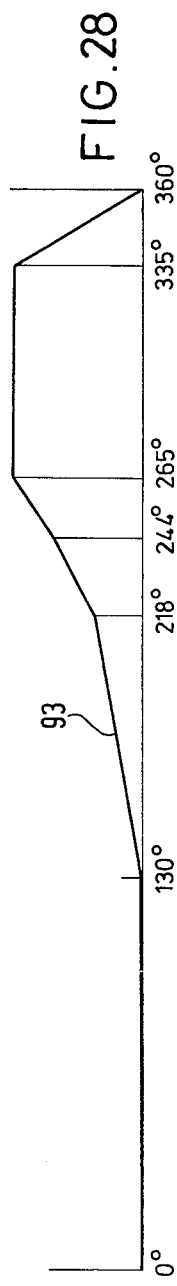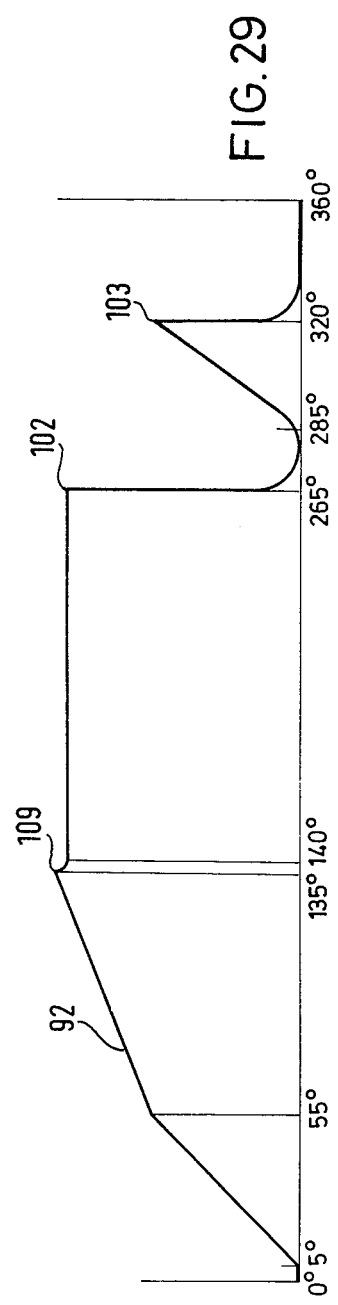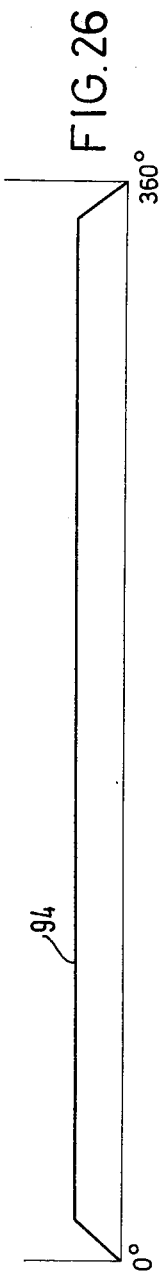

APPARATUS FOR REMOVING THE INSULATION FROM ELECTRICAL WIRES

TECHNICAL FIELD

This invention relates to apparatus for removing the insulation from the end of an insulated electrical wire, the apparatus comprising a clamping device for clamping the wire and a cutting device with knives adapted to approach each other, to cut into the insulation of the wire, and to pull the insulation separated from the electrical conductor core, wherein the clamping device and the cutting device can be actuated in mutually adjustable relationship by motor-driven control means.

BACKGROUND OF THE PRIOR ART

Apparatus of this type has been described in German Offenlegungsschrift 25 16 499. The wire from which the insulation is to be removed is inserted between two clamping jaws prior to cutting into the insulation with two knives and prior to removing the insulation. The apparatus makes it possible to remove the insulation from a wire, the conductor core of which has a cross section of only 0.14–1.5 mm2. It is considered a disadvantage of this apparatus that by clamping the insulation of the conductor on both sides, indentations and possibly even damage to the insulation may be caused. It is another disadvantage that, owing to cutting into the insulation only from two sides, the piece of insulation to be removed can be separated only partially and not in the form of a clear cut prior to tearing away such portion of the insulation from the remaining insulation. This may result in unacceptable conditions in the ensuing utilization of the wire from which the insulation was removed, for example when the insulation is not completely removed, the part of the insulation remaining must be manually removed prior to soldering, as otherwise reliable soldering would not be possible.

Further, the known apparatus does not allow for the removal of an insulation made from a very hard plastic from an electrical wire, so that the possibilities of using the known apparatus are very limited.

BRIEF SUMMARY OF THE INVENTION

The goal and the purpose of the instant invention is therefore to create apparatus of the above-specified type, wherein the above-described disadvantages and shortcomings are eliminated and with which various types of insulation can be rapidly, cleanly, and simply freed from the conductor core. The removal of the insulation is initiated by inserting the end of the wire into the apparatus, without fear of folding the end of the wire even in the case of very small diameters of the conductive core of the wire, whereupon the insulation is removed fully automatically.

According to the invention, the above-noted problems are solved by providing an improved wire stripping apparatus comprising a housing having a hole for insertion of the wire to be stripped, a chuck coaxial with the insertion hole, a knife head adapted for improved circumferential cutting, switch means which can be actuated by the insertion of the most delicate wires to be stripped, and motor-driven control means which provide for the timed operation of components to provide a complete operating cycle.

According to one aspect of the invention, the chuck employs at least three jaws for improved clamping of the insulated wire. Adjustable jaw spacing can be provided, so that the apparatus can handle various sizes of wire. One specific mechanization provides for convenient external adjustment using a knob and a calibrated scale. This mechanization also provides for simultaneous adjustment of cutting diameter of the knives, so that insulation can be completely removed without damage to the conductor core, when wire size is changed.

According to another aspect of the invention, the knife head employs at least three knives. This aspect permits improved circumferential cutting to assure separation of the insulation under all conditions. An additional feature controls motion of the knives during stripping so as to provide complete or partial removal of insulation.

In a third feature of the invention, a switch is provided for sensing insertion of the wire to be stripped requiring a mechanical force which is so low as not to buckle any size wire being used. Length of insulation to be removed is determined by adjustment of switch location along the reference axis defined with respect to the insertion hole. Provision is made for moving the switch axially as the wire is stripped, in order to provide clearance for the insulation piece being removed.

Control means consisting of multiple cams operating on a motor-driven shaft operate through linkages to the elements of the apparatus to provide chuck closure, knife closure, axial motion of the knife, and to maintain the motor circuit in operation through the complete operating cycle. A specific mechanization is disclosed which employs four cams, one for each of the functions enumerated.

The clamping device is a chuck, or clamping head preferably comprising at least three clamping jaws equally spaced around an axis of symmetry and adapted to move in synchronism therewith and in equal distances therefrom. The cutting device is a preferably a knife head coaxial with the chuck and mounted in the direction of feed of the wire. The knife head comprises at least three knives uniformly spaced around the axis of symmetry and movable relative thereto in equal distances therefrom. The knife head is adapted to be moved axially relative to the chuck along the axis of symmetry. The clamping head and knife head are adjustable to a predetermined diameter of the insulation or of the conductor core by unique adjustment means. In the direction of feed of the wire, and behind the knife head, there is provided a switching device being responsive to slight pressure to make operative the motor-driven control means. The control means comprises a plurality of cams affixed to a motor-driven shaft to actuate the clamping head, the knife head, and the motor control means of the apparatus.

By using at least three clamping jaws and at least three cutting knives, the clamping of the wire from which the insulation is to be removed and, more specifically the cutting, is improved, because three or more clamping jaws and cutting knives uniformly arranged around a wire insulation having a circular cross section can more precisely conform to the conductor than only two clamping jaws or cutting knives used in the known apparatus. Since the insulation of the wire can be cut over almost its entire circumference down to the conductor core of the cable, or at least close to it, it is possible to remove the insulation from wires having extremely hard insulating material. Finally, the switching means of the invention, which responds even to very slight pressures, makes it possible to remove the insulation from an electrical wire having a very small cross section of, for example, 0.05 mm², without the risk of bending the front end of the conductor when the latter is fed in and touches the stop of the switching device.

BRIEF DESCRIPTION OF THE DRAWINGS

Additional features, details, and advantages of the invention can be inferred from inspection of the following description of a preferred embodiment of the invention with reference to the appended drawings. In the drawings:

FIG. 18 shows an adjustment device for the switching device in the rest position.

FIG. 19 shows an adjusting device for the switching device in the position of operation.

FIG. 22 is an enlarged longitudinal cross sectional view of the knife head of the apparatus taken along line XXII—XXII of FIG. 23.

FIG. 23 is a front view of the knife head shown in FIG. 10 and shows the cutting knives.

FIG. 26 shows the camming curve of a switching cam actuating the end-point switch for control of motor operation.

FIG. 27 shows the camming curve of a clamping cam.

FIG. 28 shows the camming curve of a stripping cam.

FIG. 29 shows the camming curve of a cutting cam.

DETAILED DESCRIPTION OF THE INVENTION

Figure 1:
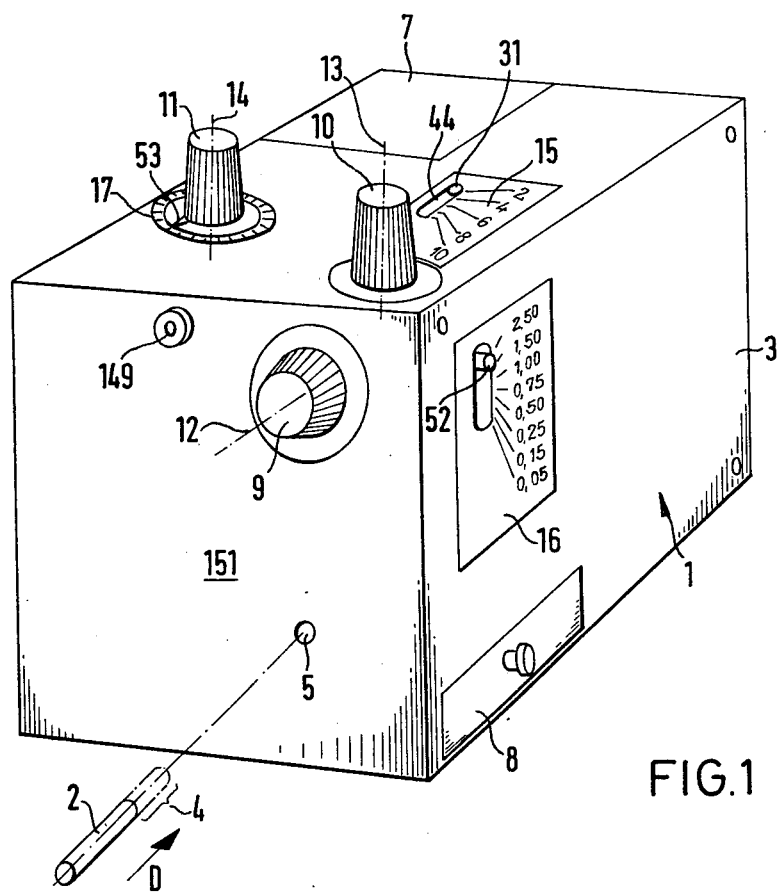
FIG. 1 is a perspective view of the apparatus used to remove the insulation from electrical wires by employing the principles of the invention.

As shown in FIG. 1, apparatus 1 according to the invention for removing the insulation from an insulated electrical wire 2 is mounted in a protective housing 3. The end of wire 2 with the insulation 4 to be removed can be introduced into an opening 5 in housing 3 so far into the direction of arrow D, until wire 2 engages the switching device 6 shown in FIGS. 5 and 25. When the switching device 6 is engaged, a motor 7 for the apparatus 1 is energized. At the end of a working cycle, i.e., after having removed the insulation from the end of wire 2, motor 7 is de-energized and the insulating piece 4 drops as waste into a drawer-shaped receptacle 8 which can be inserted into housing 3 from the outside and which is periodically emptied.

Shafts 12, 13, and 14, each of which protrudes from housing 3 of apparatus 1 and is provided with a knob 9, 10, and 11, respectively, are used to adjust apparatus 1 to various conditions of operation, as indicated in the following description. The setting of each of knobs 9 and 10, can be read scales 15 and 16, respectively. The setting of knob 11 is indicated on scale 17 in FIG. 2.

The components of apparatus 1 and their functioning are explained with reference to FIG. 2 and the following figures.

Figure 5:
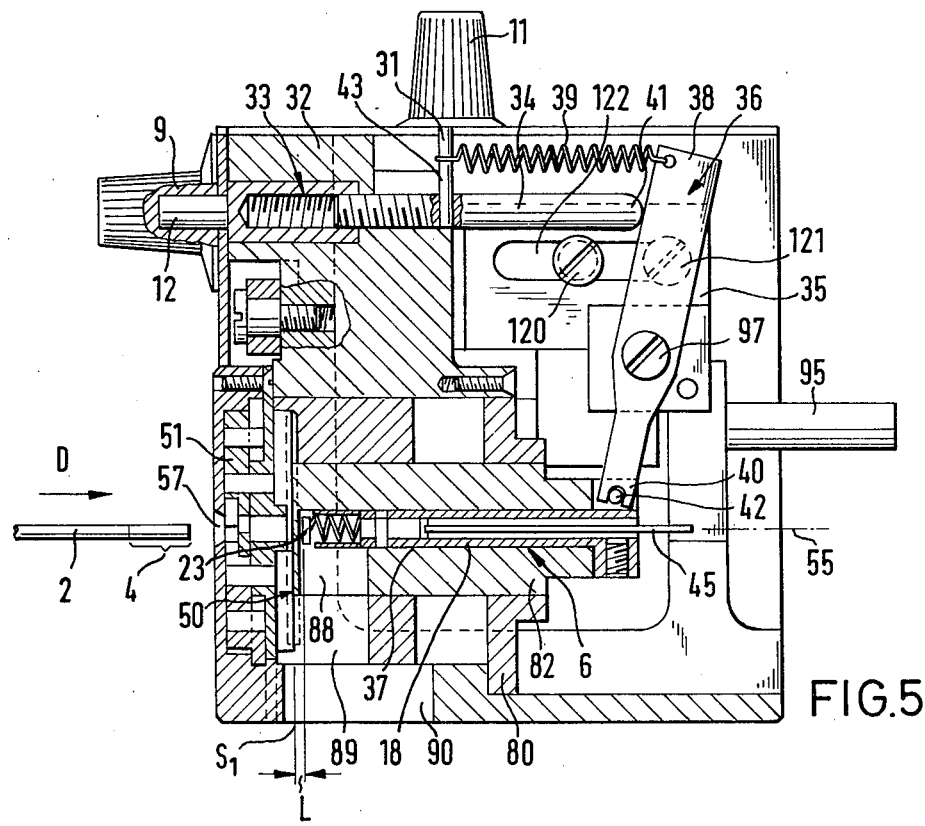
FIG. 5 is a cross sectional view of the apparatus taken along line V—V of FIG. 3.
Figure 25:
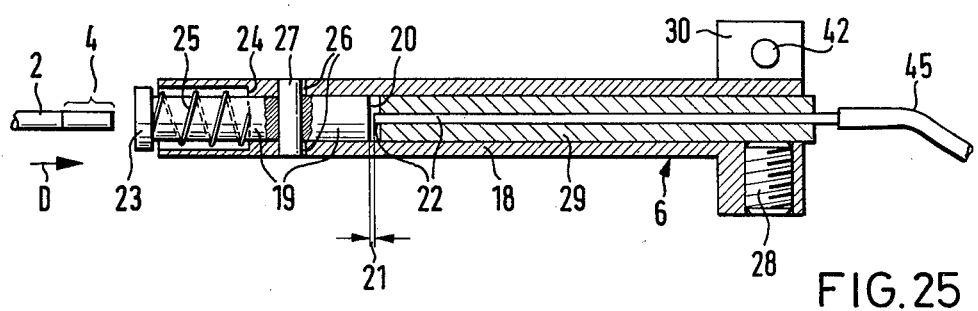
FIG. 25 is a longitudinal cross sectional view of the switching device of the apparatus.

As shown in FIGS. 5 and 25, the switching device 6 is provided with a switching member 19 adapted to slide inside tubular housing 18 and with a contact rod 22 whose rear end is connected with motor 7 through an electrical cable 45; contact rod 22 is embedded in insulating body 29 coacting with a contact surface 20 provided on the one end of said switching member and spaced therefrom by axial distance 21, the insulating body adjustable inside housing 18 by means of a setting screw 28.

The front end of switching member 19 is provided with a stop member 23 axially protruding from housing 18. A biasing spring 25, which tends to urge switching member 19 out of housing 18 in the axial direction, is disposed between stop 23 and a shoulder 24 inside housing 18. A sleeve 27, which penetrates switching member 19 in the radial direction and can be moved in the axial direction with its two ends disposed in elongated slots 26 in housing 18, prevents switching member 19 from being urged out of housing 18 beyond a certain position in the axial direction, when spring 25 acts. Switching member 19 can be moved in the axial direction by a force acting in the direction of arrow D to overcome the biasing spring force, when switching member 19 is moved, the spacing 21 from contact rod 22 decreases.

The force which is required for the axial shifting and which acts upon stop member 23 of switching member 19 depends upon the resilience of compression spring 25. During operation, the force acting upon stop member 23 of switching member 19 is transmitted by the end of wire 2 from which the insulation is to be removed. The required force should be minimized, particularly in view of the fact that insulation is to be removed from conductor cores having extremely small cross section. If the force required for actuating the switching device 6 exceeds the buckling resistance of wire 2, the end of wire 2 is bent before the insulation has been removed.

Spacing 21 (FIG. 25) between contact surface 20 of switching member 19 and contact rod 22 can be adjusted by means of the setting screw 28 provided on housing 18 to minimize spacing 21. In this manner, the force exerted by the spring is kept constant. Thus production tolerances can be compensated for.

Figure 9:
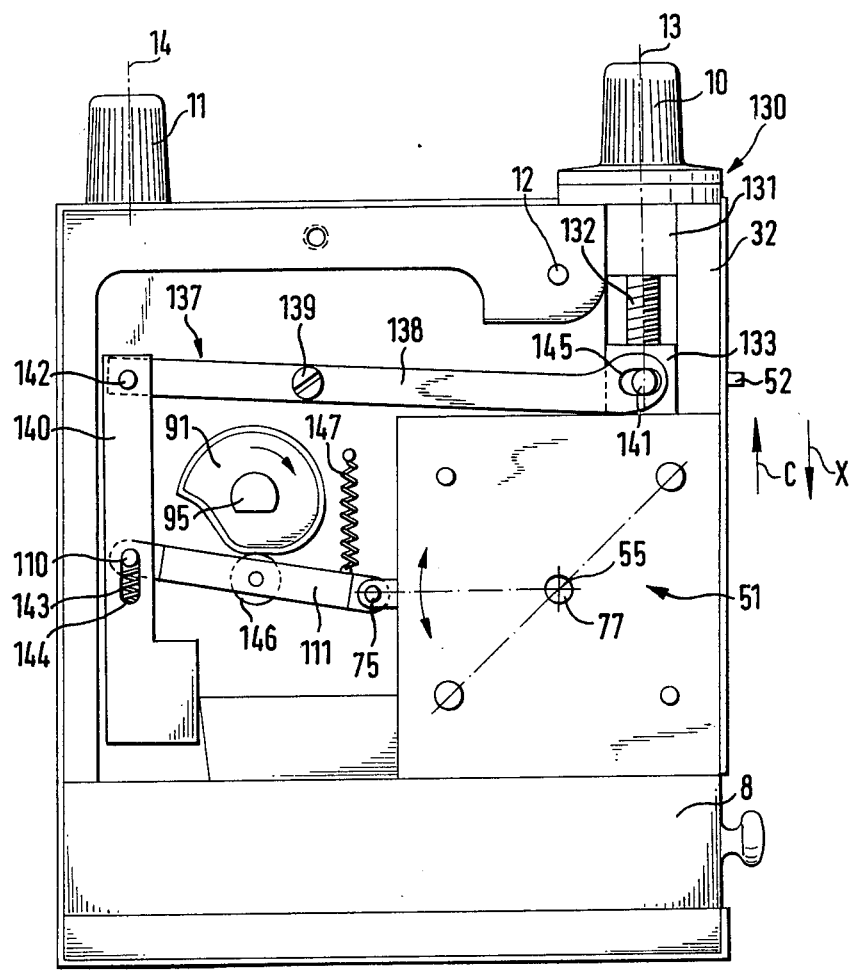
FIG. 9 is a front view of the apparatus with the chuck in the rest position, when the chuck is adjusted to the minimum diameter of the insulation.
Figure 10:
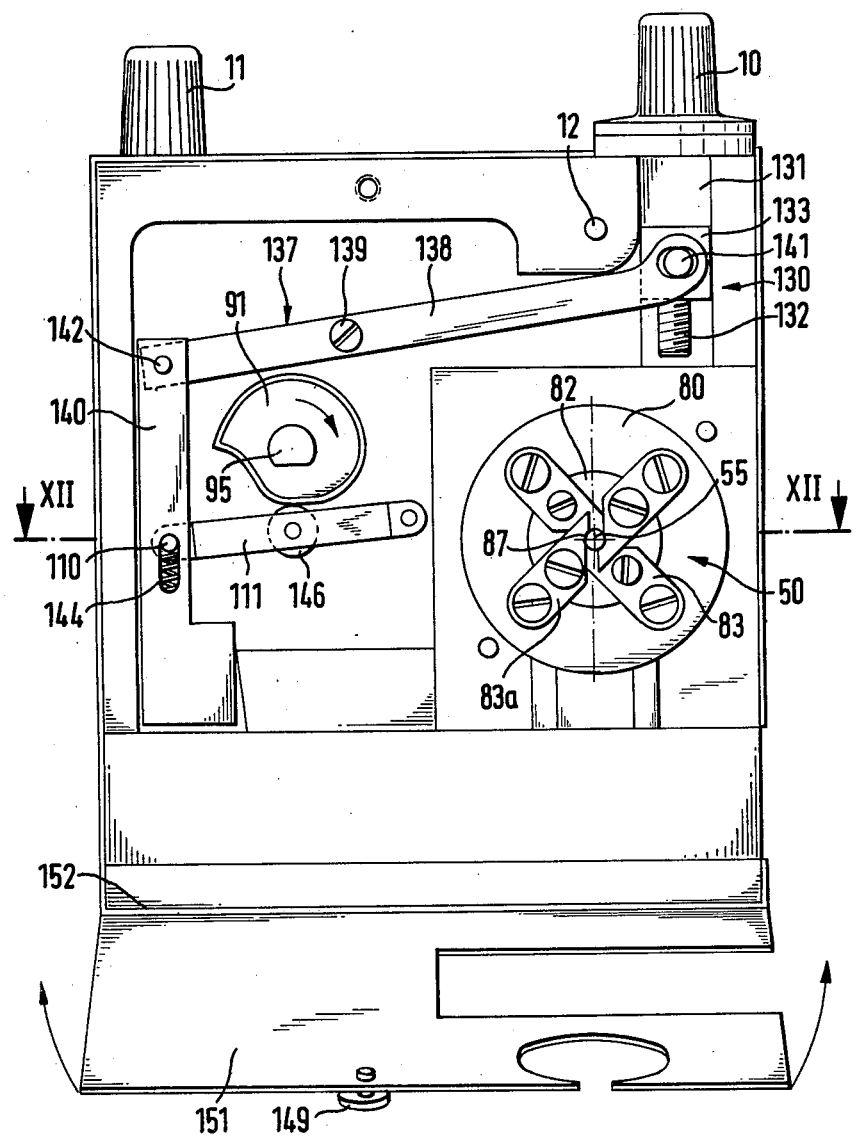
FIG. 10 is a front view of the apparatus without the protective housing and without the clamping head, with the knife head shown in the rest position.
Figure 11:
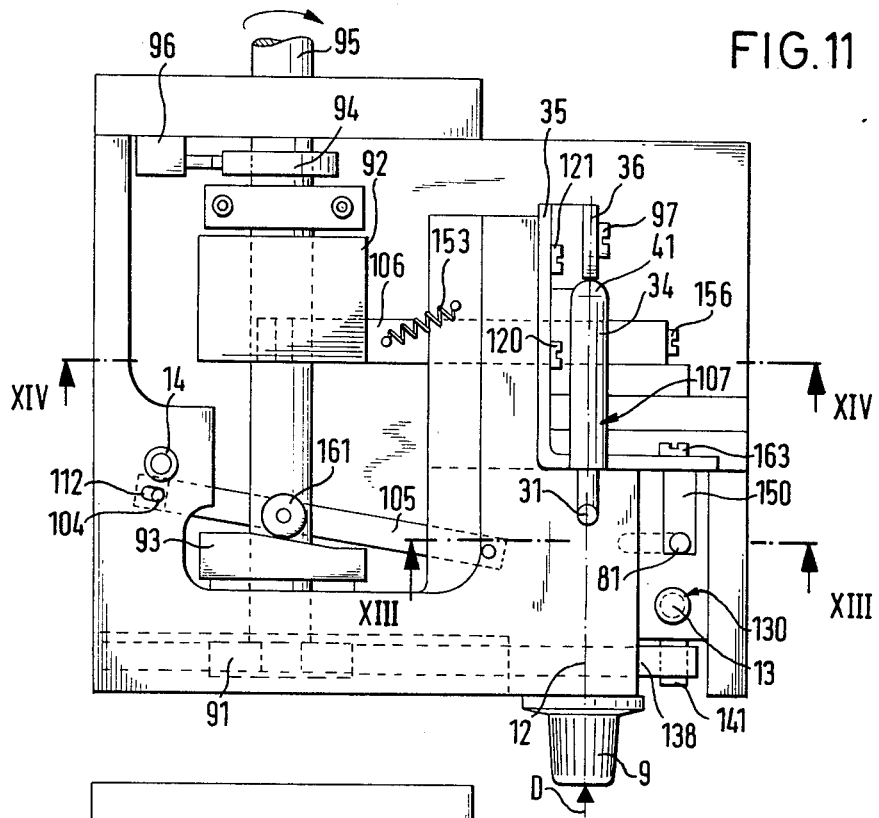
FIG. 11 is a top view of the apparatus without the protective housing.
Figure 17:
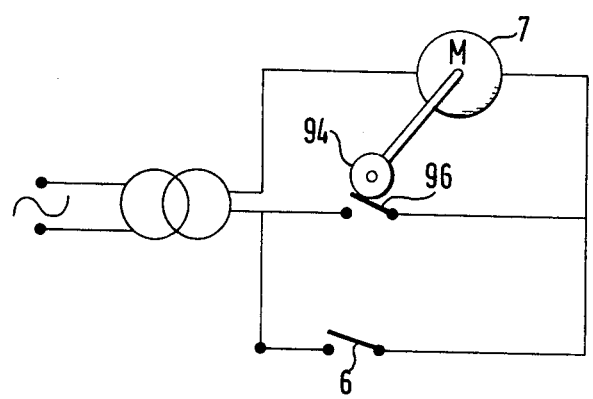
FIG. 17 shows the circuit diagram for the motor driving the control means of the apparatus.

The above-described contact of switching member 19 with contact rod 22 closes the circuit of motor 7, motor 7 is energized, and, as shown in FIGS. 3, 6, 8, 9, and 10, shaft 95 is rotated clockwise. FIG. 11 shows that shaft 95 carries a clamping cam 91, a cutting cam 92, an insulation-removing cam 93, and a switching cam 94. In the circuit of motor 7, another switch, a so-called end-point switch 96, is connected in parallel with the switching device 6; switch 96 can be actuated by switching cam 94 of shaft 95, as shown in FIGS. 11 and 17.

When the switching device 6 has been initially closed, endpoint switch 96 is closed via switching cam 94 rotated by motor 7. During the operating cycle the contact of switching means 6 is interrupted by the removing motion of knife head 50. At the end of a cycle of operation, switching cam 94 permits end-point switch 96 to open whereby motor 7 (which is a so-called braking motor) and shaft 95 joined with the motor, along with cams 91, 92, 93, and 94 affixed to shaft 95, are brought to a stop at the initial position, i.e., to their rest positions. When the switching device 6 is closed again, motor 7 is energized to pass through a full cycle of operation. The camming curve of switching cam 94 is shown in FIG. 26. In one preferred embodiment, motor 7 used to operate the unit has a torque of 0.9 Nm. This suffices to reach clamping forces of 160 N, cutting forces of 100 N. and removing forces of 120 N. The apparatus of the invention can be used with wire gages having conductor cross section s of 0.05–2.50 mm². This relatively large range makes it necessary to adjust unit 1 to the diameter of the insulation of wire 2 from which the insulation is to be removed. The following description outlines the adjustment operation.

Before unit 1 is put into operation, knobs 9, 10, and 11 are used to adjust the desired or required conditions of operation (see FIG. 1).

The length L of the insulation to be removed can be adjusted with knob 9 (see FIGS. 5, 18 and 19). The rotation of knob 9 can be followed via pointer 31 on scale 15 on which the lengths of the insulation pieces to be removed are indicated (e.g., range of 2–10 mm).

Shaft 12, which is connected with knob 9, supported by frame 32, and extending parallel to the axis 55 of symmetry of the knife head 50 and the clamping head 51 (both will be described below in detail), coacts with a spindle drive 33 and axially shifts a spindle 34 in the direction R and V; spindle 34 is mounted coaxial with shaft 12.

Figure 16:
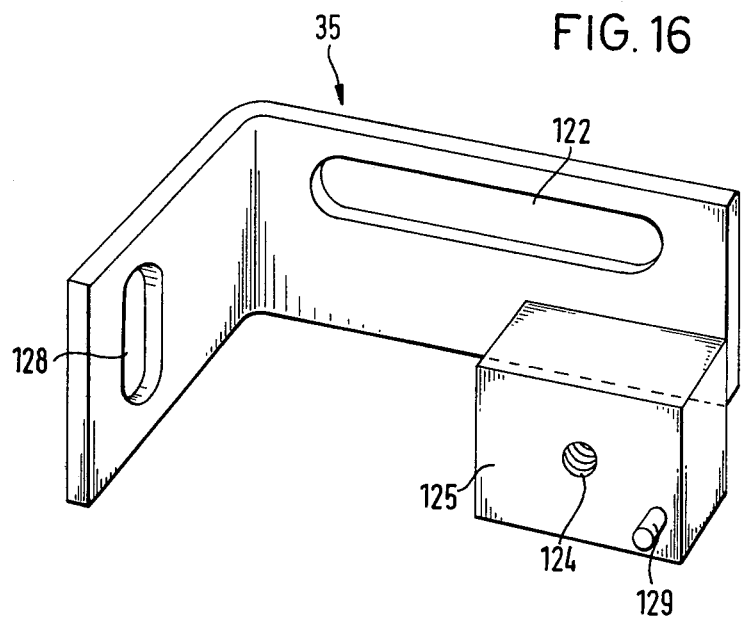
FIG. 16 shows a bracket for receiving a controlling lever for the switching device.

A bracket 35, which can be linearly moved in the directions R and V, is attached to frame 32 with two screws 120, 121 (see FIGS. 18, 19) which permits the bracket to slide beneath the screw heads. For this purpose, bracket 35 is provided with a long slot 122 extending in the direction of motion (FIG. 16). A sliding member 123 is provided on frame 32 between the two screws 120, 121 (FIG. 16). Bracket 35 carries a block 125 having a thread 124. A bolt 97 screwed into thread 124 is used to rotatably mount a control lever 36 at block 125 of bracket 35. During operation, the upper end 38 of control lever 36 is urged toward the free end 41 of spindle 34 by means of a tension spring 39, the other end of which is attached to a pin 43 radially penetrating spindle 34 (see FIGS. 5, 18, and 19). The preferably double-fork shaped lower end 40 (lower end during operation) of control lever 36 embraces both ends of a pin 42 penetrating through a tongue 30 provided on housing 18 of switching device 6. During operation, the switching means can shift in the axial direction within a longitudinal slot 37 of an internal cylinder 82 of knife head 50, the sliding taking place in the direction of the axis 55 of symmetry. One end of pin 43 penetrating spindle 34 passes through a long slot 44 provided in frame 32 parallel to the axis of spindle 34; pin 43 also passes through housing 3 and in this manner forms a pointer 31 which is visible from the outside and indicates the instantaneous position of spindle 34 and, hence, the position of the switching device 6 on scale 15 (FIG. 1). Since the end of pin 43 forming pointer 31 is supported by the longitudinal faces of long slot 44, the pin 43 also prevents spindle 34 from rotating when spindle drive 33 is actuated by knob 9.

The length L of the insulation 4 to be removed by unit 1 corresponds to the spacing between cutting plane $S_1$ of knife head 50 in the rest position (i.e., before the beginning of a working cycle) and the face of stop member 23 of switching member 19 of switching device 6, as shown specifically in FIG. 18. By axially adjusting spindle 34 before operation of the apparatus, control lever 36 shifts switching device 6 as a whole.

The shifting takes place in the axial direction of the switching device so that the spacing between stop member 23 of switching member 19 and cutting plane $S_1$ of knife head 50 and, hence, the length L of the insulation 4 to be removed can be changed within well-defined limits, i.e., between 2 and 10 mm in the embodiment under consideration.

In FIGS. 18 and 19, spindle 34 is shown in the same axial position. However, it is easy to recognize that, under the assumption that bracket 35 does not change its position, axial shifting of the free end 41 of spindle 34 to the right causes a displacement of the lower end 40 of control lever 36 to the left and vice versa. Since in the embodiment under consideration, the lever arms z on both sides of the pivot point formed by screw 97 of control lever 36 have identical lengths, the axial displacement of spindle 34 coincides with the change in the length L of the insulation piece to be removed.

Knob 10 adjusts both knife head 50 and clamping head 51 to the diameter of the insulation to be removed from wire 2.

Figure 13:
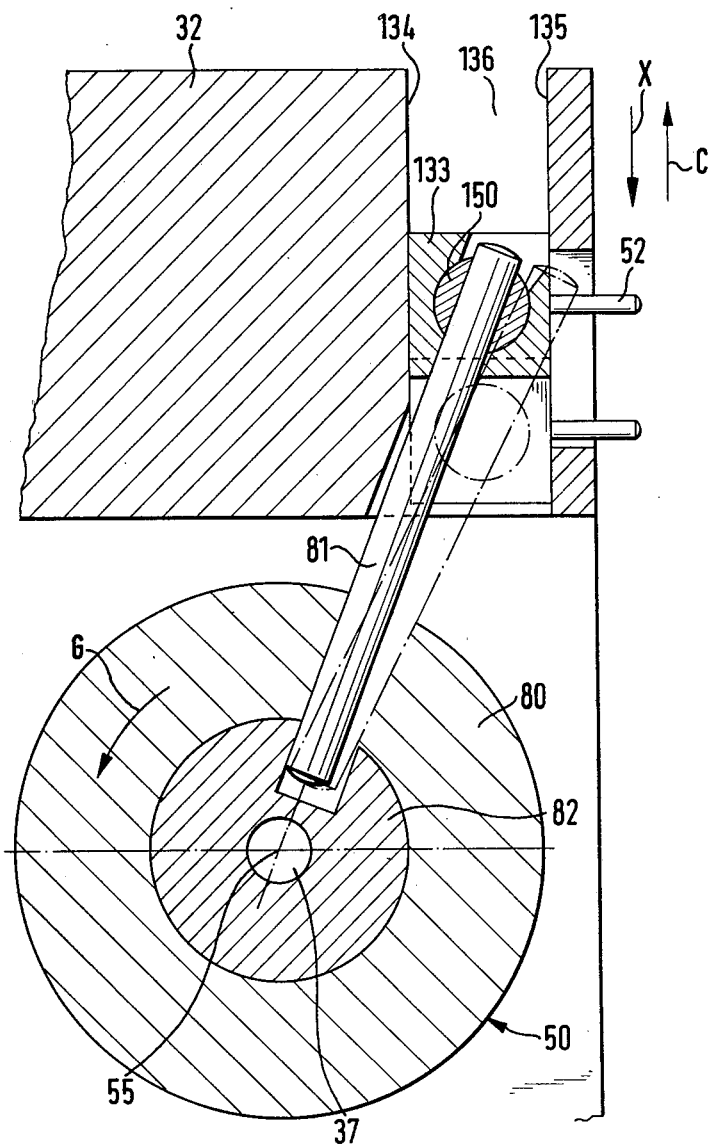
FIG. 13 is a cross sectional view of a portion of the machine taken along line XIII—XIII of FIG. 11.

Shaft 13 of knob 10 is joined with a spindle drive 130 (see FIGS. 8, 9) comprising a member 131 nonrotatably attached to frame 32 and a screwed spindle 132 axially fixed in member 131 but rotatable by knob 10. Screwed spindle 132 extends through a thread provided in a sliding block or slider 133 which can move back and forth in the directions C and X between a recess 136 in walls 134, 135 which are parallel. Block 133 easily slides with a minimum of backlash in directions C and X (FIG. 13).

Figures 20, 21:
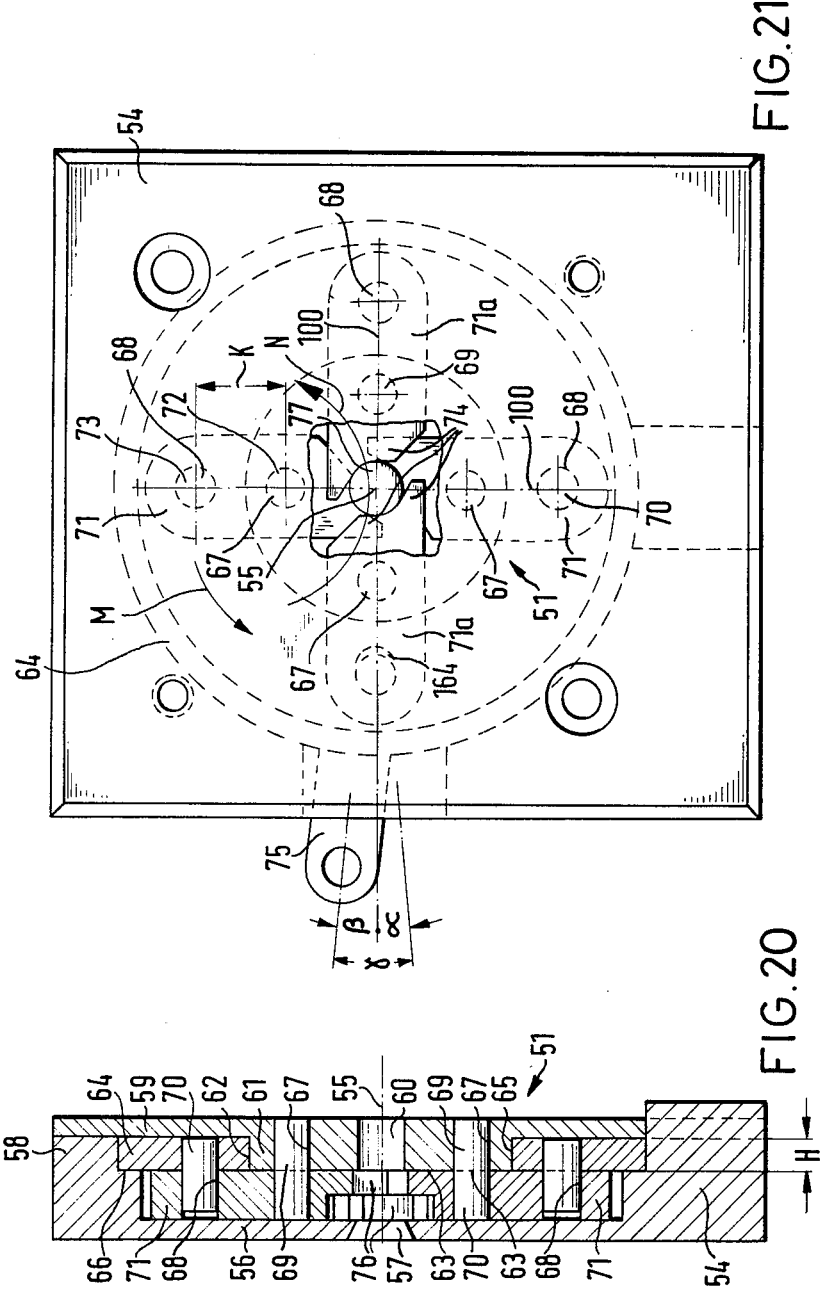
FIG. 20 is an enlarged longitudinal cross sectional view of the clamping head of the apparatus.
FIG. 21 is a front view of the clamping head with the clamping jaws indicated by broken lines.

Clamping head 51 is connected through linking rods 137 (FIGS. 3, 8, 9 and 21) with slider 133 so that lever 75, with which the width of a pasageway 77 for wire 2 can be adjusted (as outlined below), can be rotated over an angle $\beta$ (preferably $\beta=5°$; see (FIG. 21). Linkage 137 comprises a transverse rod 138, a vertical rod 140, and a transverse rod 111. Transverse rod 138 is mounted to rotate around the shaft of a bolt 139 in frame 32. Transverse rod 138 encompasses a pin 141 provided on slider 133 and is also connected to vertical rod 140 through a joint 142. The lower portion of vertical rod 140 is provided with a central slot receiving one end of transverse rod 111. Transverse rod 111 is provided with a pin 110 forming a pivot. The ends of pin 110 are supported in long slots 143 which extend in the direction of the longitudinal axis of vertical rod 140 and are disposed in the region of the central slot of vertical rod 140. Pin 110 is kept in the upper position by a spring 144.

At the end embracing pin 141 of slider 133, tranverse rod 138 is provided with a long slot 145 which extends in the longitudinal direction of transverse rod 138 but perpendicular to the axis of spindle drive 130. Pin 141 is supported by long slot 145 without backlash in the C and X directions but with the possibility of backlash in the direction of transverse rod 138. The kinematics of linkage 137 necessitates the backlash, as can be directly inferred from inspection of FIGS. 8 and 9.

When slider 133 is in the upper position (FIG. 8), lever 75 of clamping head 51 is adjusted to the maximum diameter of the insulation through linkage 137 (see FIG. 21). However, if by rotating knob 10, slider 133 is shifted downward (FIG. 9), vertical rod 140 causes the pin or the pivot point 110 of transverse rod 111 to rise. A roller 146 mounted in central position on transverse rod 114 is supported by the contour of the first clamping cam 91, so that transverse rod 111 urges lever 75 downward (FIGS. 9 and 21). In this manner clamping head 51 has been adjusted to the minimum diameter of the insulation.

Continuously adjustable intermediate positions between the two extreme positions described above are possible for any diameter of the insulation.

The maximum diameter of the insulation can be adjusted by rotating knob 10, while transverse rod 111, on which resetting spring 147 acts, is returned into its initial position.

Spring 144, which keeps pin 110 in the upper position, serves to absorb excessive bending loads, which may act upon transverse rod 111 as a consequence of a random increase in the thickness of the conductor's insulation.

The size of the spacing of the clamping jaws, i.e., the size of passageway 77, is indicated outside housing 3 on scale 16 by means of a pointer 52 attached to slider 133 and passing to the outside through frame 32 ad housing 3.

The adjustment of knife head 50 to the desired diameter of the conductor core is described below. Since knife head 50 and its components are described below, the cooperation of knob 10 with knife head 50 is only briefly discussed.

Figure 4:
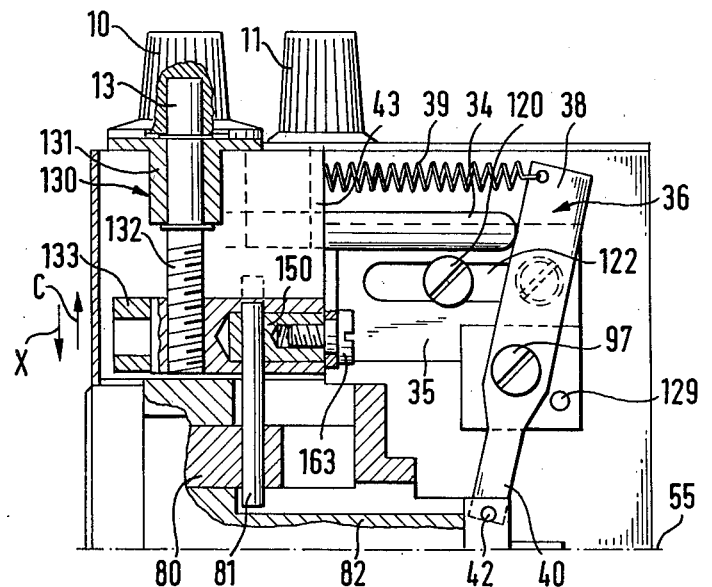
FIG. 4 is a cross sectional view of the apparatus taken along line IV—IV of FIG. 3.

As shown in FIGS. 22 and 23, knife head 50 is provided not only with the internal cylinder 82 mentioned above, but also with an external cylinder 80 which must be rotated in the direction of arrow G relative to internal cylinder 82 which is stationary in the rest position of the unit, when knife head 50 is adjusted to the maximum diameter of the conductor. Rotation is effected with adjusting lever 81 which radially penetrates external cylinder 80 through a bore (as shown in FIGS. 4 and 13). The lever end protruding from external cylinder 80 runs through a cylinder 150 provided in central position in slider 133 and movable axially in it, i.e., in the direction of a straight line parallel to axis 55 of symmetry.

Lever 81 passes through slider 133 when unit 1 is viewed from the side (FIG. 4) at a point differing from that of screw spindle 132 of spindle drive 130. Spindle drive 130 is situated above the plane of the cross section shown in FIG. 13 and therefore cannot be illustrated (see also FIG. 11).

FIG. 13 shows the principle of adjusting the knife head 50 to the desired diameter of the conductor. When slider 133 is shifted upward in the direction C, lever 81 rotates counterclockwise around axis 55 of symmetry in the direction of arrow G and drives external cylinder 80 (adjustment to the maximum diameter of the conductor core). When slider 133 is moved downward in the direction X, lever 81 and, hence, external cylinder 80 are rotated clockwise around the axis 55 of symmetry (adjustment to the minimum diameter of the conductor core).

These adjustments correspond to the adjustments of clamping head 51. As indicated above, the adjustments are indicated on scale 16 by pointer 52 of slider 133.

Knob 11 is used to adjust to a mode of operation in which the piece 4 of the insulation removed from conductor 2 by knife head 50 is either fully stripped from the end of conductor 2 and removed as waste or pulled away over some distance from the point of the cut but left on the end of conductor 2. The latter mode of operation is convenient when fine wire strands are to be prevented from untwisting at the end of conductor 2 after removal of the insulation. To this end, the pivot point, around which a lever 105 controlled by the cam of removing cam 93 and transferring knife head 50 into the removing motion, is rotated, is shifted so that the fullstroke of cam 93 is effective in one position (piece 4 is completely removed from conductor 2) but gripped only partially by cam 93 in another position (piece 4 is pulled away from the point of the cut only over a certain distance and then remains in that position on the core of conductor 2; see FIGS. 6, 11 and 12).

Figure 6:
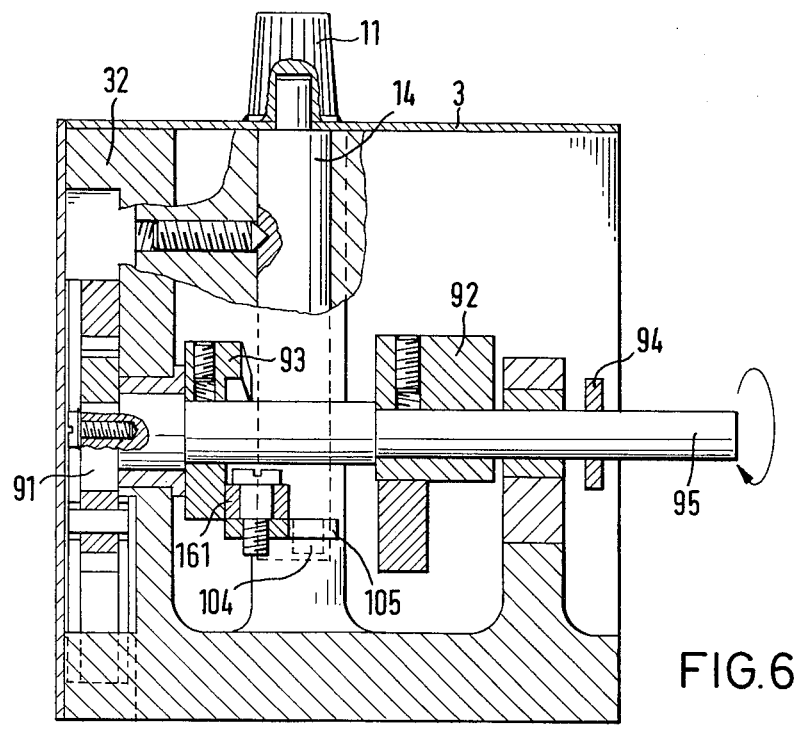
FIG. 6 is a cross sectional view of the apparatus taken along line VI—VI of FIG. 3.
Figure 12:
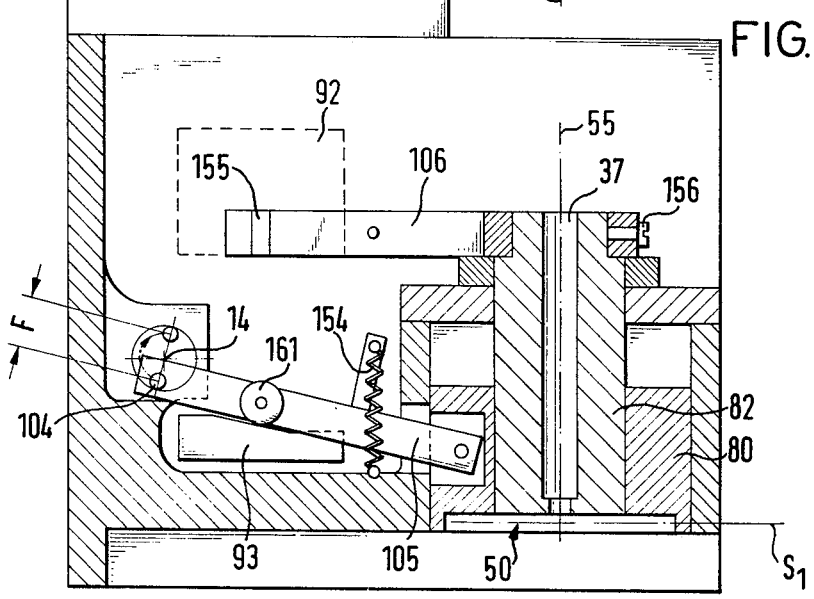
FIG. 12 is a cross sectional view of the apparatus taken along line XII—XII of FIG. 10.
Figure 24:
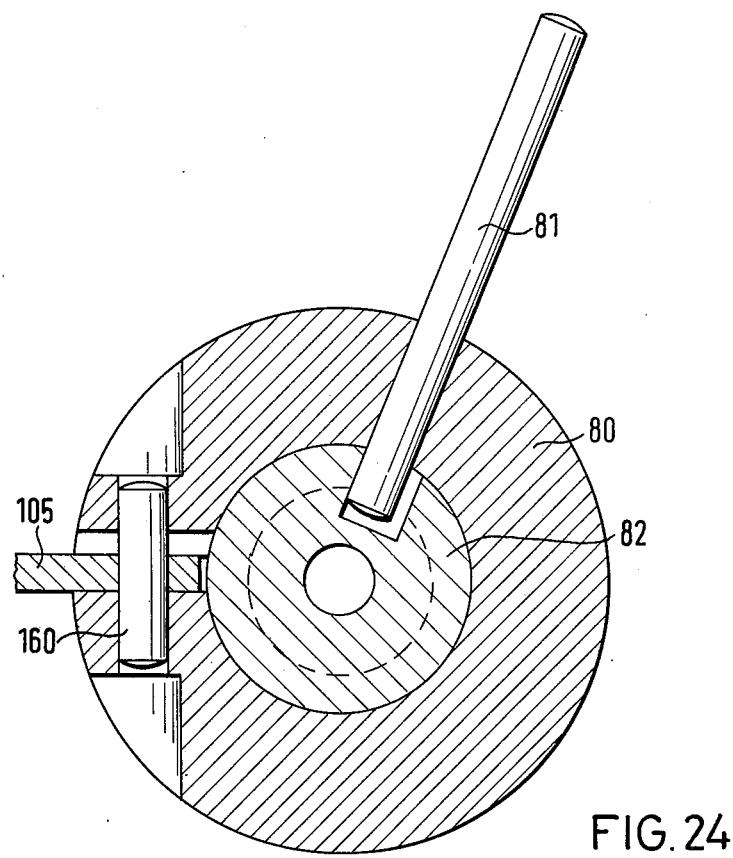
FIG. 24 is a cross sectional view of the knife head taken along line XXIV—XXIV of FIG. 22.

The movable pivot point is formed by an eccentric pin 104 mounted at the lower end of shaft 14 of knob 11 and passing through one end of lever 105 (see FIGS. 6 and 12). The other end of lever 105 is attached by means of a bolt 160 to external cylinder 80 of knife head 50 (FIG. 24). By rotating knob 11 over 180°, the pivot point of lever 105 is shifted over the distance F (FIG. 12 shows the shifting of the pivot point plotted to an enlarged scale which does not correspond to the actual distance F).

The particular position of the pivot point is indicated on scale 17 by means of a pointer 53 provided on the edge of knob 11.

The clamping head 51 and then knife head 50 are now described in detail.

The purpose of clamping head 51 is to clamp conductor 2 at the beginning of an operational cycle in a certain position and to keep conductor 2 in that position until knife head 50 has cut into insulation 4 of conductor 2 and removed piece 4 either completely or partially from the end of the conductor. A new operational cycle and, therefore the operation of clamping head 51, are triggered by the end of conductor 2 from which the insulation is to be removed; this happens when the end is introduced into opening 5 of housing 3, i.e., when the end transfers the above-described switching member 19 into the switching position and therefore puts apparatus 1 into operation for performing a cycle.

As shown in FIGS. 20 and 21, clamping head 51 is a unit of rotational symmetry which is mounted in a housing 54 of rectangular cross section, the housing being attached to frame 32. The axis 55 of symmetry of the clamping head is coaxial with opening 5 of apparatus 1. Housing 54 has a stationary front panel 56 with a bore 57 passing through panel 56 and conically extending toward the front side; housing 54 also comprises a rear panel 59 which covers the interior of housing 54 on the rear and is attached to edge 58 of the housing preferably by screws (see FIG. 20). At the center of rear panel 59 there is provided a bore 60 aligned with bore 57 of front panel 56 in the position of operation; the diameter of bore 60 is about the same as that of bore 57. On the side facing the interior of housing 54, rear panel 56 is provided with a circular flange 61 protruding toward front panel 56 and concentric with bore 60. Flange 61 has in the radial direction a cylindrical shoulder 62 and in the axial direction a front face 63 which is perpendicular to the axis 55 of symmetry. Clamping head 51 comprises a clamping ring 64 with a cylindrical inner face 65, the ring 64 being disposed in the interior of housing 54 when in the position of operation. The axial dimension of clamping ring 64 approximately corresponds to the height H of flange 61. In the position of operation, the inner face 65 of clamping ring 64 bears sufficiently strongly against shoulder 62 of flange 61 so that clamping ring 64 can be rotated in the direction of arrow M around flange 61 without backlash (FIG. 21). Clamping ring 64 is prevented from axial movement by the planar inner face of rear panel 59 on the one hand and by a shoulder 66 provided on housing 54, on the other hand. Flange 61 and clamping ring 64 are preferably provided with four bores 67 and 68 which have the spacing K and are uniformly distributed over the periphery of ring 64 and aligned in the radial direction when they are in the position of operation. Bores 67 and 68 receive bolts 69 and 70 which are fixed in those bores and extend parallel to the axis 55 of symmetry toward the front panel 56 of housing 54. Each of the four pairs of bolts carries a clamping jaw 71 or 71a. In other words, each of the four clamping jaws 71, 71a is provided with spaced bores 72, 73 (spacing K) for the pairs of bolts 69, 70. When compared with the diameter of the bolts 69, 70, bores 72, 73 have tolerances such that the bolts can be rotated in the bores without clearance. One of the bores 72, 73 penetrated by bolts 69, 70 of each of the clamping jaws 71, 71a must have the form of a long slot 164 extending in the direction of central axis 100 of clamping jaws 71, 71a (FIG. 21), because during an operational cycle, the spacing K of the bolts 69, 70 changes, as described below.

When clamping ring 64 is rotated in the direction of arrow M in the interior of housing 54 relative to the rear panel 59, the ends 74 facing the axis 55 of symmetry are rotated in the direction of arrow N. The ends 74 of clamping jaws 71, 71a can be shaped as shown in FIG. 21.

According to the invention, the ends 74 overlap like the segments of a diaphragm or of a shutter of a photo camera. As shown in FIG. 21, the ends 74 can embrace and keep a cylindrical body such as an insulated conductor 2 in a stationary position, provided that clamping ring 64 is rotated sufficiently in the direction of arrow M. In this manner, it is possible to remove the insulation from wires which only slightly protrude from circuit components. By rotating clamping ring 64 in the direction opposite to arrow M, a clamped workpiece is released.

Clamping jaws 71 are distinguished from clamping jaws 71a insofar, as they comprise milled sections on opposite sides in the over-lapping regions. The two clamping jaws 71 are the "left form", and the two clamping jaws 71a the "right form". Once clamping head 51 has been mounted in housing 54, clamping jaws 71, 71a are located on a single plane, as shown in FIG. 20.

At the clamping surfaces 76, which in the clamping position touch the insulation of the wire 2, the ends of clamping jaws 71, 71a are provided with a corrugation to improve the clamping effect.

Depending upon the diameter of the insulation of the wire from which the insulation is to be removed, a passageway 77 for inserting the end of conductor 2 is formed by the ends 74 of all four clamping jaws 71, 71a and adjusted by rotating knob 10. By rotating knob 10, the size of passageway 77 can be increased or reduced. The following description outlines the transfer of the rotational motion of knob 10 onto clamping jaws 71, 71a of clamping head 51.

A lever 75 is provided on clamping ring 64, passes through housing 54 outwardly in the radial direction, and can be rotated at most over an angle X. Lever 75 is used to transfer ring 64 from the rest position (unclamping) into the position of operation (clamping position) and to return it to the initial position (FIG. 21).

The function of knife head 50 is to remove the piece 4 at the end of a wire 2 from the insulation remaining on the conductor and to strip piece 4 either completely or partially from the conductor core.

As shown in FIGS. 22 and 23, knife head 50 comprises an external cylinder 80 with a lever 81 radially penetrating cylinder 80 and used to adjust knife head 50 to the corresponding diameter of the insulation, an internal cylinder 82 rotatably supported by external cylinder 80 but prevented from axial motion relative to it, and four cutting knives, namely two cutting knives 83, and two cutting knives 83a. Cutting knives 83, 83a are attached with a screw 84 to external cylinder 80 and with a screw 85, 85a to internal cylinder 82. One of the perforations through which screws 84, 85/85a penetrate each cutting knife 83 must have the form of a long slot 165 extending in the direction of the central axis of the cutting knives 83, 83a, because, during a cycle of operation, the spacing A of screws 84, 85/85a changes, as outlined below.

The ends of cutting knives 83, 83a have the form of crescent-shaped edges 86, 86a shaped so that they overlap like the segments of a diaphragm or of the shutter of a photo camera and leave a passageway 87 of approximately circular cross section. In the rest position of apparatus 1, the size of passageway 87 approximately corresponds to the size of passageway 77 of clamping head 51 in the rest position.

Cutting knives 83 and 83a are mounted in pairwise opposite relationship and pairwise overlap in the range of the ends facing axis 55 of symmetry at knife head 50. The two cutting knives 83 form the "left configuration" and the two cutting knives 83a the "right configuration", so that, once they have been appropriately attached to knife head 50, the edges 86, 86a of the four cutting knives 83, 83a are always situated on a single plane $S_1$ and cut the insulation with a single, clean cut when apparatus 1 is in operation.

When in the course of an operational cycle, internal cylinder 81 is rotated relative to external cylinder 80 in the direction of arrow W the cutting edges 86, 86a of cutting knives 83, 83a perform a rotational motion (cutting motion) indicated by arrow W, by which knife head 50 is transferred into the operational position (cutting position). While this goes on, the cutting edges 86, 86a of the four cutting knives 83, 83a reduce the size of passageway 87 by approximately the thickness of the insulation to the diameter of the metallic conductor core without insulation. Cuts are made by the cutting edges into the insulation so that the cut piece can be removed from the remaining insulation and stripped either completely or partially from conductor 2 upon moving the entire knife head 50 axially in the direction of arrow Q while the knife head is kept in the cutting position (see FIG. 22).

When knife head 50 has been adjusted to the maximum size of passageway 87, the back 78 of one of the two cutting knives 83a hits the edge of one of the two screws 85 to limit the width of passageway 87.

The entire piece 4 of insulation removed from the end of conductor 2 can drop into receptacle 8 provided for this purpose, as indicated above; piece 4 drops through perforations 88, 89, and 90 provided for this purpose in both the internal cylinder 82 and the external cylinder 80 and in the frame 32 of the housing (see FIG. 5).

The removal of the insulation proceeds as follows.

When a wire 2 is introduced through opening 5 of housing 3, through passageway 77 of clamping head 51, and through passageway 87 of knife head 50, the end of the wire hits stop member 23 of switching member 19 of switching device 6 and causes a switch closure, as described above with reference to FIG. 25. Motor 7 begins to run and rotates shaft 95 along with cams 91, 92, 93, and 94 mounted on shaft 95.

First of all, switching cam 94 closes end-point switch 96 so that motor 7 remains energized even after interrupting the contacts of switching device 6 (FIGS. 17 and 26). Thereafter, cams 91, 92, and 93 become effective in succession and interact (as indicated by the camming curves shown in FIGS. 27, 28, and 29).

By means of clamping cam 91 lever 75 of clamping head 51 is rotated through transverse rod 111 and, accordingly, clamping ring 64 is rotated relative to housing 54 of clamping head 51 by a certain angle (preferably 4°) so that the passageway 77 of clamping head 51 is accordingly narrowed, by which action wire 2 is held in its position (FIGS. 8, 9, 20, and 21).

Figure 7:
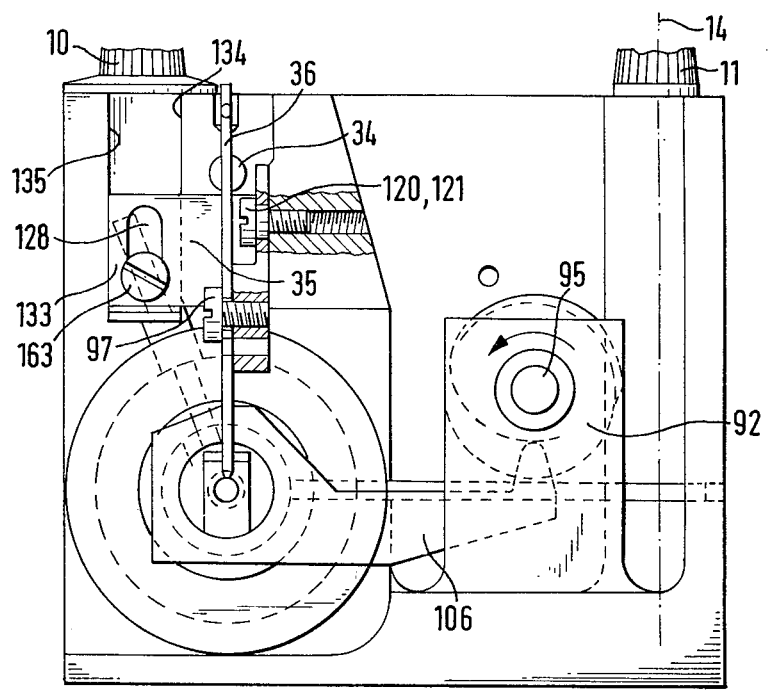
FIG. 7 is a partially broken away rear view of the apparatus.
Figure 8:
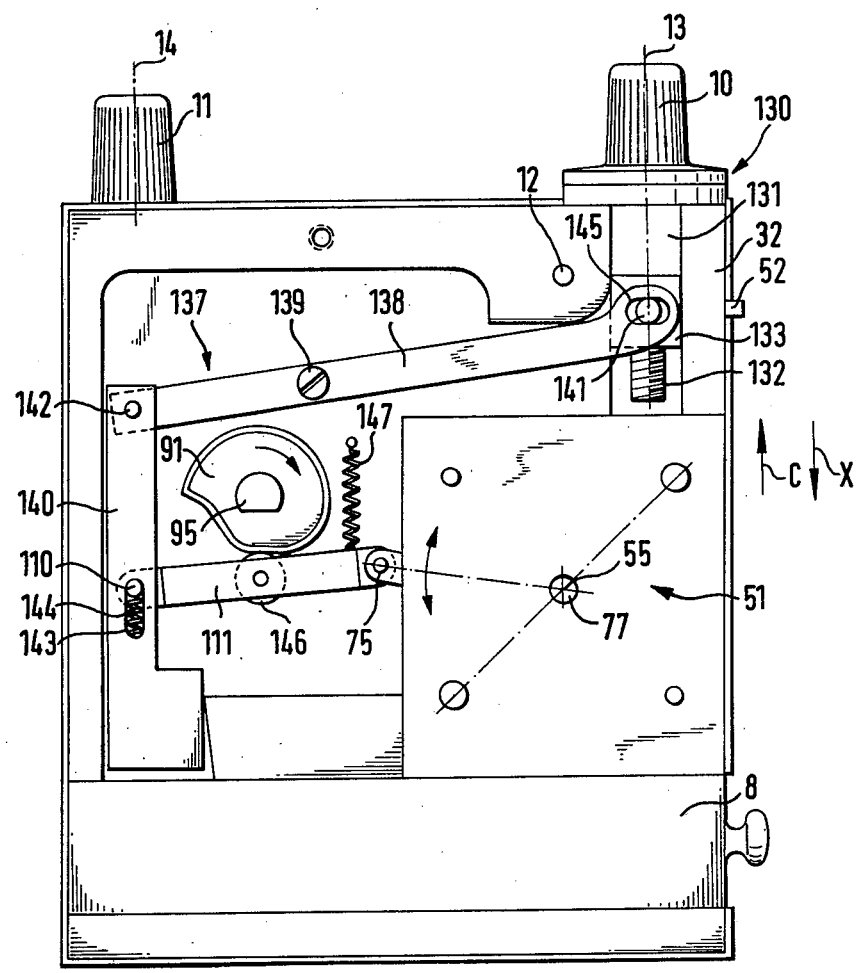
FIG. 8 is a front view of the apparatus with the protective housing removed and with the clamping head, or chuck, in the rest position, when the clamping head is adjusted to the maximum diameter of the insulation.
Figure 14:
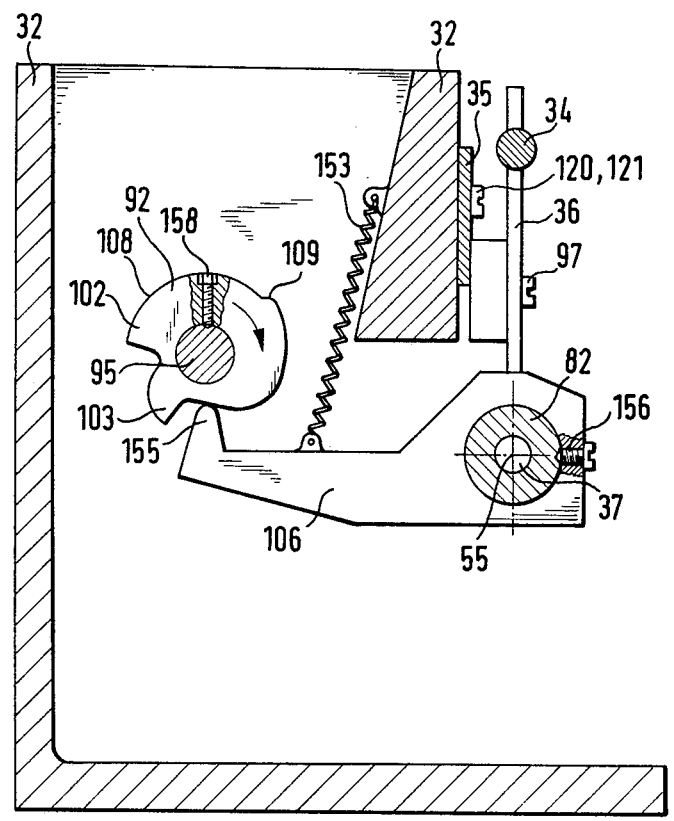
FIG. 14 is a cross sectional view of the apparatus taken along line XIV—XIV of FIG. 11.

Almost at the same time the contour 108 of cutting cam 92 depresses a lug 155 provided on the end of cross member 106 (see FIGS. 7 and 14). Lug 155 of cross member 106 is constantly urged against contour 108 of cutting cam 92 by means of a spring 153 mounted between frame 32 and cross member 106. Cross member 106, which is also connected through screw 156 with the end of internal cylinder 82 of knife head 50 counterclockwise rotates internal cylinder 82 in the direction of arrow T (FIG. 23) and, in this manner, transfers the knife head 50 into the cutting position, which was described above.

Figure 15:
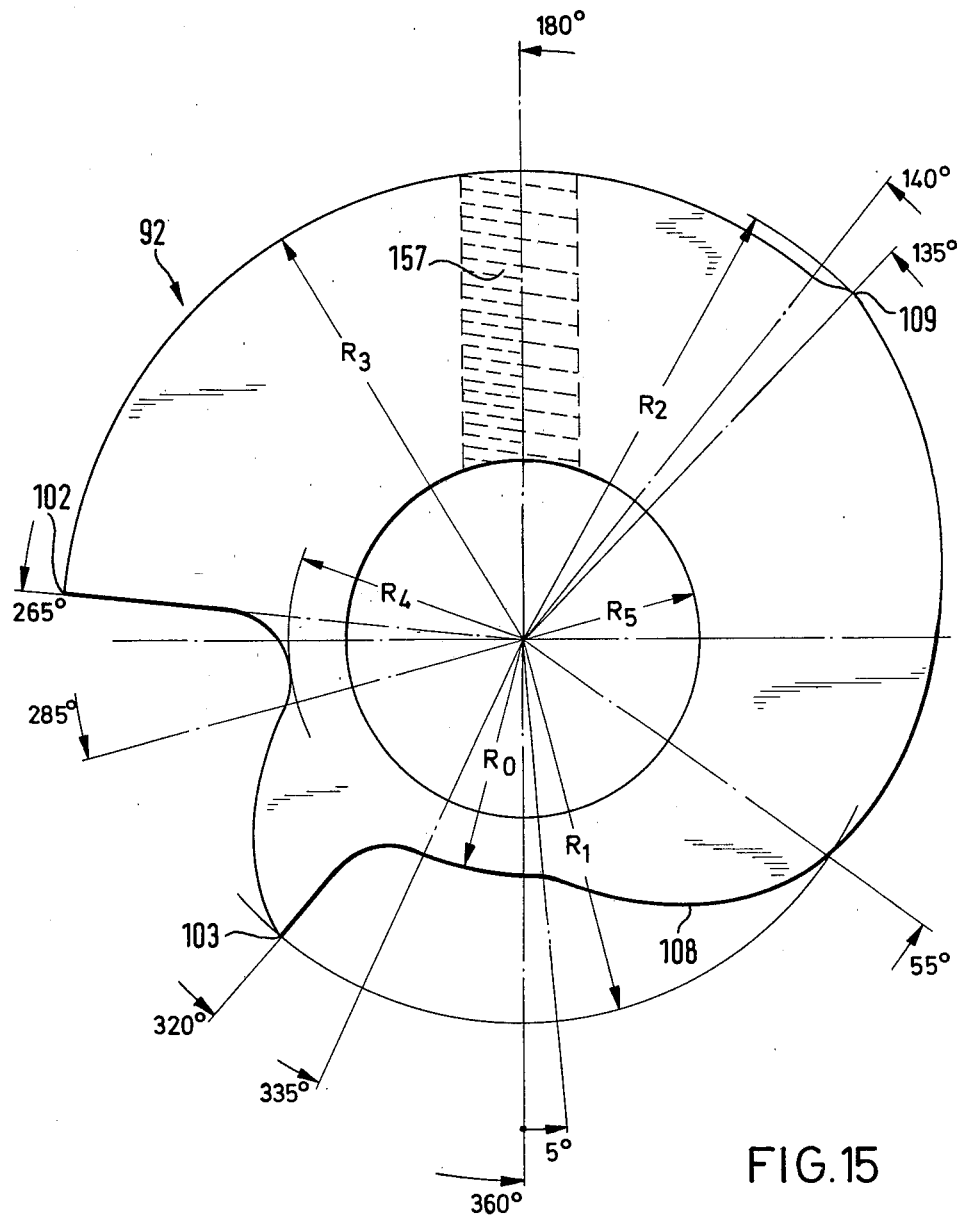
FIG. 15 is a front view of the control cam of FIG. 14 and shows the curve of the cam on an enlarged scale.

The camming curve which is preferably used for cutting cam 92 is shown in FIGS. 15 and 29. Further, an internal thread 157 receiving a headless screw 158 is used to attach cutting cam 92.

Figure 2:
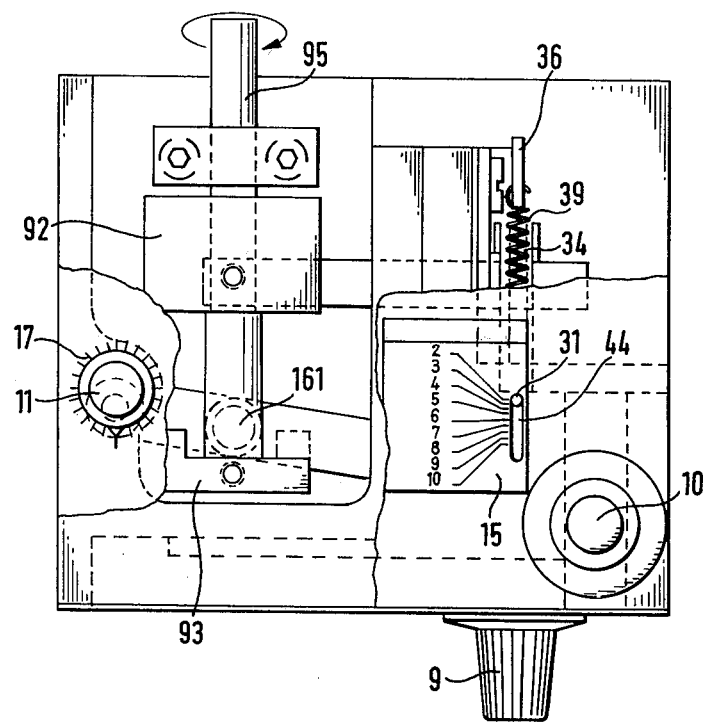
FIG. 2 is a partially broken away top view of the apparatus of FIG. 1.
Figure 3:
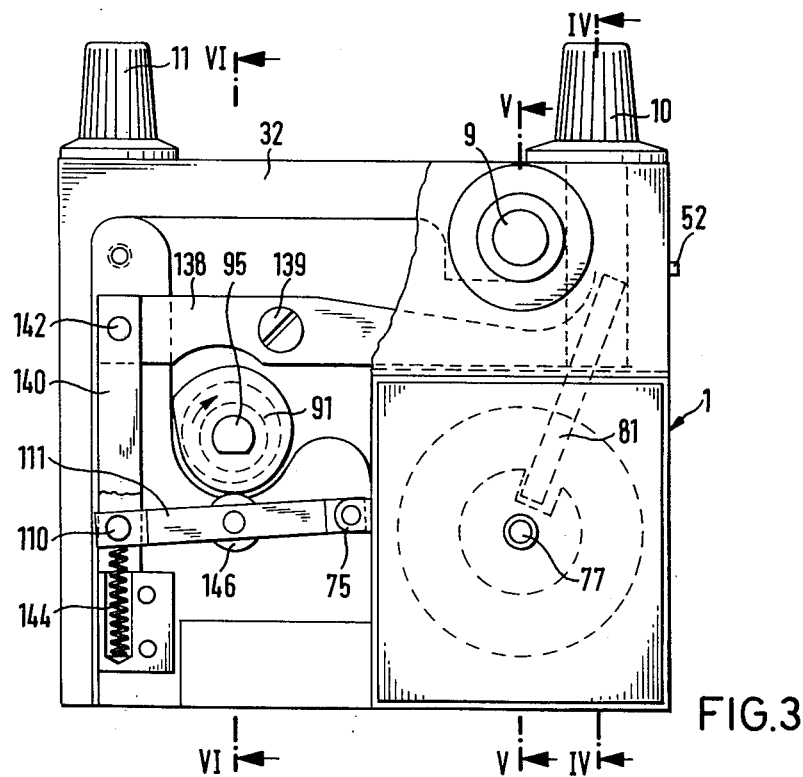
FIG. 3 is a partially broken away front view of the apparatus.

Removing cam 93 urges lever 105 via a roller 161 attached to lever 105 into the direction of arrow D (see FIGS. 2, 11, and 12). The consequence is that external cylinder 80, along with the entire knife head 50, are also axially shifted parallel to the axis 55 of symmetry in the direction of arrow D. Roller 161 of lever 105 is biased by spring 154 mounted between 105 and frame 32 and constantly bears on removing cam 93 (FIG. 12).

When knife head 50 is shifted in the axial direction, the cutting knives 83, 83a are still in the closed position and in this matter (depending upon the setting of knob 11) the knobs either strip the cut piece 4 of insulation from the conductor or shift piece 4 over a short distance, as described above. In order to prevent conductor 2 from being damaged, the contour 108 of cam 92 has a small shoulder 109 at 135°, so that, after the actual cutting, the passageway 87 of knife head 50 is slightly enlarged (see FIG. 23; FIGS. 15 and 29 at 135°). Thus, the cutting edges 86, 86a of cutting knives 83, 83a cannot damage the conductor. This design feature also helps to preserve the cutting edges 86, 86a.

The step 102 provided at the 265° position of cam 92 opens knife head 50, which thereafter is briefly closed by the so-called "dropping step" 103 at the 320° position. In the latter position, any piece of insulation which still may be in the vicinity of cutting knives 83, 83a of knife head 50 drops from the knife head.

In order to obtain sufficient space for piece 4 of the insulation to be removed, the switching device 6 which is slideably mounted inside internal cylinder 82 of knife head 50 is shifted as a whole relative to knife head 50 in the direction of arrow D, while the knife head 50 performs the removing motion over the distance E. The switching device 6 is shifted over the double distance 2E in the following manner.

When knife head 50 is shifted in the direction D along its axis 55 of symmetry (shifting over a distance E), both lever 81 and cylinder 150, through which lever 81 passes and which is slideably mounted in slider 133, are shifted over the same distance E (FIGS. 4 and 13). Bracket 35 is attached to face 162 of cylinder 150 by means of a screw 163 passing through a long slot 128 (FIG. 16), so that cylinder 150 can freely move relative to bracket 35 when an adjustment to the core cross section is made by rotating knob 10 in the directions C and X but so that bracket 35 is carried along the axis 55 of symmetry in the direction D in the case of axial shifting of cylinder 150.

When knife head 50 is shifted from the position shown in FIG. 18 to the right into the position of FIG. 19 over a distance E, screw 97 inserted into bracket 35 also moves to the right over the same distance E; screw 97 is the pivot of lever 36. Since the two lever arms on both sides of the pivot have the same length Z, the lower end 40 of lever 36 moves to the right over twice the distance 2E (relative to stationary spindle 38) until stop 129 is reached. The motion is magnified because the upper end 38 bears against end 41 of spindle 34 which is stationary during operation of unit 1.

Thus, the stop member 23 of switching member 19 of switching device 6 travels over a distance 2E to the right and releases piece 4 of the insulation toward receptacle 8 after stripping piece 4 from wire 2 by the movement of knife head 50. Thus, the cutting plane $S_1$ of knife head 50 was shifted toward the cutting plane $S_2$ (FIGS. 18 and 19).

It should be emphasized that by appropriately shaping housing 3, apparatus 1 is readily accessible for small repairs and for servicing. It is particularly advantageous to provide for the easy removal of front panel 151 of housing 3, because in this case one obtains easy access to clamping head 51 and (having removed head 51) to knife head 50, as shown in FIG. 10. Front panel 151 can be attached to housing 3 by means of hinges and to frame 32 by means of knurled screw 149.

From the foregoing, it can be readily realized that this invention can assume various embodiments. Thus, it is to be understood that the invention is not limited to the specific embodiments described herein, but is limited only by the appended claims.

I claim:

1. Wire stripping apparatus for removing the insulation from the end of the conductor core of an insulated wire, comprising:
a housing having a hole in one wall for insertion of an end of the insulated wire to be stripped, said hole establishing a reference axis; a chuck mounted at the inside wall of said housing coaxially with said insertion hole, said chuck having jaws operating in a plane and a clamping ring surrounding said jaws, said jaws being disposed in circumferential overlapping relationship, said jaws further being pivotally mounted on an inside wall of said chuck, each jaw also being pivotally attached at one end to said clamping ring, one of said pivots on each jaw comprising a pin which extends through a slot on said jaw thereby permitting the jaw to slide with respect to said pivot; a knife head in said housing having multiple knives adapted to be separated to define a rest position and to approach each other to define a cutting position at a cutting diameter about a knife axis which coincides with said reference axis, said knife head being mounted so as to be movable along said reference axis; switch means in said housing having a part thereof intersecting said reference axis so that the end of said insulated wire may actuate said switch means after said wire is inserted into said hole and passes through said chuck and said knife head; motor means energized by closure to said switch; and control means, driven by said motor means, providing an operating cycle, whereby said chuck means and said knife head are operated in a timed relationship to clamp the insulated wire to be stripped, to move said multiple knives to said cutting position and cut the insulation, to strip the insulation from the conductor core, to open said chuck means and return said knife head to said rest position, and finally to deenergize said motor.

2. Wire stripping apparatus as claimed in claim 1 wherein said chuck jaws have formed ends providing a circular clamping profile when the jaws are closed.

3. Wire stripping apparatus as claimed in claim 2, wherein the clamping end of each said jaw is formed with a slanted surface having a recessed clamping surface having a recessed clamping surface, whereby the rotation of said clamping ring in one direction causes said clamping ends of said jaws to approach each other by rotation of said jaws in the opposite direction.

4. Wire stripping apparatus as claimed in claim 3 wherein said clamping ring is provided with a lever, said lever being joined to linkage means, said linkage means being actuated by said control means.

5. Wire stripping apparatus as claimed in claim 4, wherein the spacing of the clamping ends of said jaws is adjustable, the range of adjustment of said chuck jaw spacing corresponding to the range of insulated wire diameters from which the insulation is to be removed; and wherein said recessed clamping surface is a cylindrical sector having a diameter of curvature corresponding to the average of said range of insulated wire diameters.

6. Wire stripping apparatus as claimed in claim 5, wherein the spacing of the clamping ends of said jaws is adjustable by shifting the pivot point of said linkage means.

7. Wire stripping apparatus as claimed in claim 6, further comprising: a threaded shaft attached to said housing, said shaft having an unthreaded end protruding from said housing; a knob, fixed to the protruding end of said shaft; a nut riding on said shaft; a chuck adjustment lever attached to said nut and having a fixed pivot; a link attached to said chuck adjustment lever, said link being affixed to said linkage means so as to provide said adjustable pivot point; and an indicator attached to said nut, whereby the spacing of the clamping ends of said jaws is adjusted by rotating said knob so as to move said nut along said shaft, thereby moving the pivot point of said linkage, said indicator being calibrated to show the spacing of said jaws.

8. Wire stripping apparatus as claimed in claim 7, wherein the cutting diameter of said knife head is adjustable, the range of adjustment corresponding to the range of insulated wire diameters from which insulation is to be removed, and wherein the adjustment is provided through linkage to said nut.

9. Wire stripping apparatus as claimed in claim 3, further comprising a frame for supporting the components and housing of said apparatus, and wherein said chuck housing is removably mounted on said frame.

10. Wire stripping apparatus as claimed in claim 2, wherein said chuck has four jaws mounted in a manner to define a first diametrically opposing pair and a second diametrically opposing pair with the clamping ends of said first pair circumferentially overlapping the clamping ends of said second pair, said second pair being aligned orthogonal to said first pair, and wherein said first pair and said second pair are closely fitted to slide upon each other when said clamping ring is rotated, whereby said jaws form a gradually closing passageway of approximately circular cross-section as said jaws are closed.

11. Wire stripping apparatus for removing the insulation from the end of the conductor core of an insulated wire, comprising: a housing having a hole in one wall for insertion of an end of the insulated wire to be stripped, said hole establishing a reference axis; chuck means mounted at the inside wall of said housing coaxially with said insertion hole; a knife head in said housing having four knives mounted with equal angular spacing about said axis and adapted to be separated to define a rest position and to approach each other to define a cutting position at a cutting diameter about a knife axis which coincides to said reference axis, said knife head being mounted so as to be movable along said reference axis; said knife head further comprising an outer ring and an inner tube, said outer ring being restrained from rotation, and said inner tube being fitted to the internal diameter of said outer ring so as to be capable of rotation within said ring, wherein each knife is an elongated member having a cutting surface at one end and each knife is pivotally mounted to said inner tube with one outer end of said knife being pivotally mounted to said ring, one of said pivots on each knife comprising a pin which extends through a slot on said knife, thereby permitting the knife to slide with respect to said pivot, whereby the rotation in one direction of said inner tube with respect to said outer ring causes said knives to approach each other by rotation in the opposite direction; said knives being equally spaced and having curved cutting edges with the cutting edge of two diametrically opposed knives circumferentially overlapping the cutting edges of the other two diametrically opposed knives and with the cutting edges of the respective pairs being ground flat on the overlapping surface so that, when the internal tube is rotated with respect to the outer cylinder, the cutting edges overlap without backlash, thereby providing a scissors-like closure of said knives about a passageway of approximately circular cross-section; switch means in said housing, having a part thereof intersecting said reference axis so that the end of said insulated wire may actuate said switch means after said wire is inserted into said hole and passes through said chuck and said knife head; motor means energized by closure of said switch; and control means, driven by said motor means, providing an operating cycle, whereby said chuck means and said knife head are operated in a timed relationship to clamp the insulated wire to be stripped, to move said multiple knives to said cutting position and cut the insulation, to strip the insulation from the conductor core, to open said chuck means and return said knife head to said rest position, and finally to deenergize said motor.

12. Wire stripping apparatus as claimed in claim 11 wherein said knives operate in a plane, said cutting surfaces having crescent-shaped edges and being disposed in a circumferential overlapping relationship so that a closed circular passageway is formed between said cutting surfaces.

13. Wire stripping apparatus as claimed in claim 12, wherein the cutting edges of said knives are shaped to conform to the average diameter of the insulation to be removed from said wire.

14. Wire stripping apparatus as claimed in claim 13, wherein the cutting diameter of said knives is adjustable, the range of adjustment of said diameter corresponding to the range of insulated wire diameter to be stripped, said cutting diameter being established by rotating said internal cylinder within said outer tube through a fixed angle during operation, and said adjustment being provided by rotating said external cylinder about said inner tube by an additional angle prior to removing the insulation from a wire.

15. Wire stripping apparatus as claimed in claim 14, wherein insulation stripping is provided by axial motion of the knife head, after the knives have closed to said cutting diameter and while said knives remain substantially closed, said axial motion being provided through a lever linkage to said control means.

16. Wire stripping apparatus as claimed in claim 15, wherein the axial motion of the knife head can be reduced so that only slight motion is produced by shifting the pivot point of said lever linkage between the control means and the knife head, whereby insulation is only partly stripped from said wire.

17. Wire stripping apparatus as claimed in claim 16, further comprising: a shaft mounted to the housing of said apparatus and protruding therefrom, said shaft having an eccentrically-located pin which provides the pivot point for said lever linkage between the knife head and the control means, said lever linkage being adapted to slide as well as to rotate about the pivot point; a knob fixed to the protruding end of said shaft; and an indicator to show the position of said knob, whereby rotation of said shaft between two rest positions substantially moves said pivot point along said lever linkage, such that in one position the lever ratio is much greater than in the other.

18. Wire stripping apparatus for removing the insulation from the end of the conductor core of an insulated wire, comprising: a housing having a hole in one wall for insertion of an end of the insulated wire to be stripped, said hole establishing a reference axis; chuck means mounted at the inside wall of said housing coaxially with said insertion hole; a knife head in said housing, having multiple knives adapted to be separated to define a rest position and to approach each other to define a cutting portion at a cutting diameter about a knife axis which coincides to said reference axis, said knife assembly being mounted so as to be movable along said reference axis, switch means in said housing, having a part thereof intersecting said reference axis so that the end of said insulated wire may actuate said switch means after said wire is inserted into said hole and passes through said chuck and said knife head; said switch means further comprising: a tubular housing, a cylindrical switching member fitted to slide partially within said housing, and having a contact surface on one end of the cylindrical switch member; a spring of low resilience acting in an axial direction against said cylindrical member, the elements being fitted so that said spring biases said cylindrical member out of said tubular housing; a contact rod, embedded in an insulated body, said body fitting within said tubular housing, said rod having a contact surface on one end arranged to coact with said contact surface on the end of said switching member; and fastening means for securing said contact rod at a selected position within said tubular housing, said switching member being secured to remain within the housing by means of a transverse member passing through said cylindrical switching member and extending into one or more longitudinal slots in said housing, whereby said switching member may slide within said housing over a range limited by the length of said slots, said switch means providing a contact closure when said switching member is forced against said spring so as to provide contact between said switching member and said contact rod, thereby providing electrical continuity between said insulated rod and said body; motor means energized by closure of said switch; and control means, driven by said motor means, providing an operating cycle, whereby said chuck means and said knife head are operated in a timed relationship to clamp the insulated wire to be stripped, to move said multiple knives to said cutting portion and cut the insulation, to strip the insulation from the conductor core, to open said chuck means and return said knife head to said rest position, and finally to deenergize said motor.

19. Wire stripping apparatus as claimed in claim 18, wherein the housing of said switch means is closely fitted within said knife head so as to be axially slideable along said reference axis without backlash.

20. Wire stripping apparatus as claimed in claim 19, wherein said switch means is coupled to said knife head by a lever having a fixed pivot, such that any axial motion of said knife head within the apparatus produces axial motion of the switch means in the same direction of motion, the distance through which the switch means moves being magnified by the lever action.

21. Wire stripping apparatus as claimed in claim 20, including adjusting means for adjusting the length of the piece of insulation to be removed.

22. Wire stripping apparatus as claimed in claim 21, further comprising: a knob mounted on the outer surface of said housing; and spindle means, controlled by said knob, which moves parallel to said reference axis according to the degree of rotation of said knob, wherein the end of said spindle means provides said fixed pivot point for said lever linking the knife head to the switch means, whereby change in position of the spindle means correspondingly changes the axial position of said switch means with respect to said knife head, producing a corresponding change in the length of insulation to be removed when an insulated wire is inserted to force said switching member against said contact rod, thereby energizing said motor.

23. Wire stripping apparatus as claimed in claim 22, wherein said knob is connected to a shaft joined with said spindle means, and wherein the length of insulation to be removed is indicated on a scale associated with a pointer protruding through the housing, said pointer being attached to said spindle.

24. Wire stripping apparatus for removing the insulation from the end of the conductor core of an insulated wire, comprising: a housing having a hole in one wall for insertion of an end of the insulated wire to be stripped, said hole establishing a reference axis; a chuck mounted at the inside wall of said housing coaxially with said insertion hole; a knife head in said housing having multiple knives adapted to be separated to define a rest position and to approach each other to define a cutting position at a cutting diameter about a knife axis which coincides to said reference axis, said knife head being mounted so as to be movable along said reference axis and further comprising an outer tube and an inner tube closely fitted to rotate within said outer tube, with said knives being pivotally attached to both tubes so that relative rotation of said tubes causes said knives to approach each other or to be separated, according to the direction of relative rotation; means associated with said inner tube for moving said knives of said knife head from said rest position to said cutting diameter and subsequently returning said knives to said rest position; motor means driving said chuck and said moving means to remove said insulation; and switch means for energizing said motor means when said wire is inserted into said hole and passes through said chuck and said knife head; whereby said chuck means and said knife head are operated in a timed relationship to clamp the insulated wire to be stripped, to move said multiple knives to said cutting position and cut the insulation, to strip the insulation from the conductor core, to open said chuck means and return said knife head to said rest position, and finally to deenergize said motor.

25. Wire stripping apparatus as claimed in claim 24, wherein, after moving said knives to the cutting diameter, means are provided for partially opening said knives to a diameter greater than said cutting diameter but less than the insulation diameter and retaining said knives in such position until completion of stripping of the insulation.

26. Wire stripping apparatus as claimed in claim 25, wherein said means for partially opening said knives provides that said knives, after being opened to said rest position, are partially closed and finally reopened to said rest position after the wire stripping has been performed.

27. Wire stripping apparatus as claimed in claim 24, further comprising: a removing cam; and a stripping lever which is linked to said knife head to provide axial motion to said knife head, said lever being driven by said removing cam so that said knife head is shifted along said reference axis and toward the end of said insulated wire after said knives have closed to said cutting diameter, and before said knives return to said rest position, whereby the edges of said knives force the terminal portion of the insulation which has been separated by said knives toward the end of said wire, thereby stripping said insulation from the conductor core, said removing cam subsequently returning said knives to the initial axial position in which cutting was performed.

28. Wire stripping apparatus as claimed in claim 24, further comprising: a clamping cam; and a clamping lever; and wherein said chuck means is a movable jaw type in which the jaws are simultaneously closed by partial rotation of a clamping ring, and wherein said clamping lever is fastened to said clamping ring and is driven by said clamping cam, the profile of said cam providing chuck closure as the first step in the operating cycle and subsequent chuck opening just prior to completion of the operating cycle.

29. Wire stripping apparatus as claimed in claim 24, further comprising: a motor run cam; and a switch operated by said motor run cam, said switch being connected to activate said motor, said switch being closed immediately after said cam shaft begins to rotate, and remaining closed until all other steps of said operating cycle are completed, said switch finally opening at the end of one complete rotation of said cam shaft to complete the operating cycle.

30. Wire stripping apparatus for removing the insulation from the end of an insulated wire, comprising: a housing, having a hole in one wall for insertion of an end of an insulated wire to be stripped, said hole establishing a reference axis; a chuck mounted at the inside wall of said housing and coaxially with said insertion hole, said chuck having at least three jaws separated by equal angles with said jaws adapted to open and close in synchronism, and having adjustment means which control the spacing of the clamping ends of said jaws when closed; a knife assembly having at least three knives adapted to be separated to define a rest position and to approach each other to define a cutting diameter about a knife axis, said knives being mounted with equal angular spacing about said axis, said knife assembly being mounted in said housing in a cutting position such that said knife axis coincides to said reference axis, said knife assembly being mounted so as to be movable along said reference axis and having adjustment means which control said cutting diameter to allow the knives to cut through the insulation of an inserted wire without cutting the conductor core of said insulated wire; a first switch, mounted on said reference axis, so that the end of said insulated wire may actuate said first switch after said wire is inserted into said hole and passes through said chuck and said knife assembly, said switch being mounted so as to be movable along the reference axis by linkage to said knife assembly; a second switch electrically connected in parallel with said first switch; motor means energized by closure of either of said switches; a cam shaft rotated by said motor means and carrying four cams, and having a reference position, one rotation of said shaft constituting an operating cycle of the apparatus; a first cam which closes said second switch except when the cam shaft is aligned in the reference position; a second cam which operates said chuck so as to clamp said insulated wire into a fixed location throughout substantially the entire operating cycle as defined by the rotation of said cam shaft; a third cam which operates said knife assembly so that said knives are separated and moved to the rest position when the machine cycle is completed and when the machine is not operating said third cam being aligned so as to cause said knives to approach each other to define said cutting diameter after said chuck has clamped said wire; a fourth cam which moves said knife assembly axially toward said end of the insulated wire after the knife assembly has closed to said cutting diameter, whereby said knife assembly first cuts through the insulation of said insulated wire and said knives subsequently force the portion of the insulation between the cut location and the end of said wire to slide toward the said end, thereby stripping the insulation from the wire, said fourth cam subsequently returning the knife assembly to said cutting position.

31. In a wire stripping apparatus for removing the insulation from the end of the conductor core of an insulated wire of the type having a housing with a hole in one wall for insertion of an end of the insulated wire to be stripped and at least two knives inside of the housing which are closed about the wire to cut the wire insulation before being shifted axially with respect to the wire to remove a portion of the insulation from the wire core, the improvement comprising:

means for slightly enlarging the opening between said knives after the insulation is cut and before said knives are axially shifted with respect to the wire to space the knife edges from the conductor core without disengaging them from the insulation, thereby preventing damage to the wire core and said knives as said knives are shifted.

32. The wire stripping apparatus of claim 31 wherein said knives have crescent shaped edges which define a passageway of approximately circular cross-section as said knives close about the wire to cut the wire insulation along substantially its entire circumference, said circular passageway being slightly enlarged before said knives are axially shifted.

33. The wire stripping apparatus of claim 31 in which said knives are shifted with respect to the wire by axially moving the wire.

* * * * *